(12) United States Patent
Ishizaki et al.

(10) Patent No.: US 9,459,740 B2
(45) Date of Patent: Oct. 4, 2016

(54) TOUCH SENSOR AND DISPLAY DEVICE

(71) Applicant: Japan Display West Inc., Chita-gun (JP)

(72) Inventors: Koji Ishizaki, Aichi (JP); Kouji Noguchi, Kanagawa (JP); Tsutomu Harada, Aichi (JP); Takeya Takeuchi, Aichi (JP); Yoshitoshi Kida, Aichi (JP); Takayuki Nakanishi, Aichi (JP)

(73) Assignee: Japan Display, Inc., Tokyo (JP)

( * ) Notice: Subject to any disclaimer, the term of this patent is extended or adjusted under 35 U.S.C. 154(b) by 88 days.

(21) Appl. No.: 14/226,460

(22) Filed: Mar. 26, 2014

(65) Prior Publication Data

US 2014/0204060 A1     Jul. 24, 2014

Related U.S. Application Data

(63) Continuation of application No. 12/796,455, filed on Jun. 8, 2010, now Pat. No. 8,723,841.

(30) Foreign Application Priority Data

Jun. 30, 2009 (JP) ................................. 2009-155827
Mar. 8, 2010 (JP) ................................. 2010-050483

(51) Int. Cl.
   *G06F 3/044* (2006.01)
   *G06F 3/041* (2006.01)
   *G02F 1/1333* (2006.01)

(52) U.S. Cl.
   CPC ............. *G06F 3/044* (2013.01); *G06F 3/0416* (2013.01); *G02F 1/13338* (2013.01)

(58) Field of Classification Search
   CPC ...................................................... G06F 3/0416
   USPC .......... 345/173–178; 178/18.01–18.09, 18.11
   See application file for complete search history.

(56) References Cited

U.S. PATENT DOCUMENTS

| | | | |
|---|---|---|---|
| 4,839,634 A | 6/1989 | More et al. | |
| 6,239,788 B1 | 5/2001 | Nohno et al. | |
| 6,492,979 B1 * | 12/2002 | Kent | G06F 3/0414 178/18.01 |
| 9,024,913 B1 * | 5/2015 | Jung | G06F 3/044 178/18.06 |
| 2003/0011579 A1 | 1/2003 | Gong et al. | |
| 2003/0029239 A1 | 2/2003 | Hatanaka et al. | |
| 2008/0309627 A1 | 12/2008 | Hotelling et al. | |

(Continued)

FOREIGN PATENT DOCUMENTS

| | | |
|---|---|---|
| JP | 07-084712 | 3/1995 |
| JP | 2008-009750 | 1/2008 |
| JP | 2008-117371 | 5/2008 |

(Continued)

*Primary Examiner* — Ilana Spar
*Assistant Examiner* — Jeffrey S Steinberg
(74) *Attorney, Agent, or Firm* — Robert J. Depke; The Chicago Technology Law Group LLC

(57) ABSTRACT

A touch sensor that may detect an object away from the sensor is provided. The touch sensor includes one or more drive electrodes; one or more detection electrodes forming capacitance in cooperation with the respective drive electrodes; a detection circuit applying drive signals to the respective drive electrodes to detect the object based on detection signals obtained from the respective detection electrodes in response to the respective drive signals; and a controller controlling to change a range of electric flux lines generated between the drive electrodes and the detection electrodes.

16 Claims, 27 Drawing Sheets

(56) References Cited

U.S. PATENT DOCUMENTS

2009/0009194 A1* 1/2009 Seguine .................. G01D 5/24
324/684
2009/0096759 A1 4/2009 Nishiwaki et al.

FOREIGN PATENT DOCUMENTS

| JP | 2008-153025 | 7/2008 |
| WO | WO 2007/146780 A2 | 12/2007 |
| WO | WO2007 146783 A2 | 12/2007 |

* cited by examiner

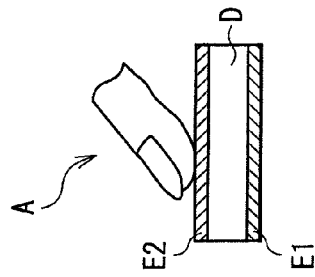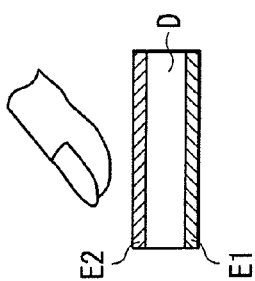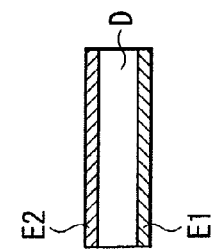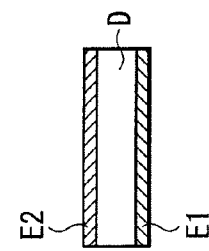
FIG. 4A  FIG. 4B  FIG. 4C  FIG. 4D

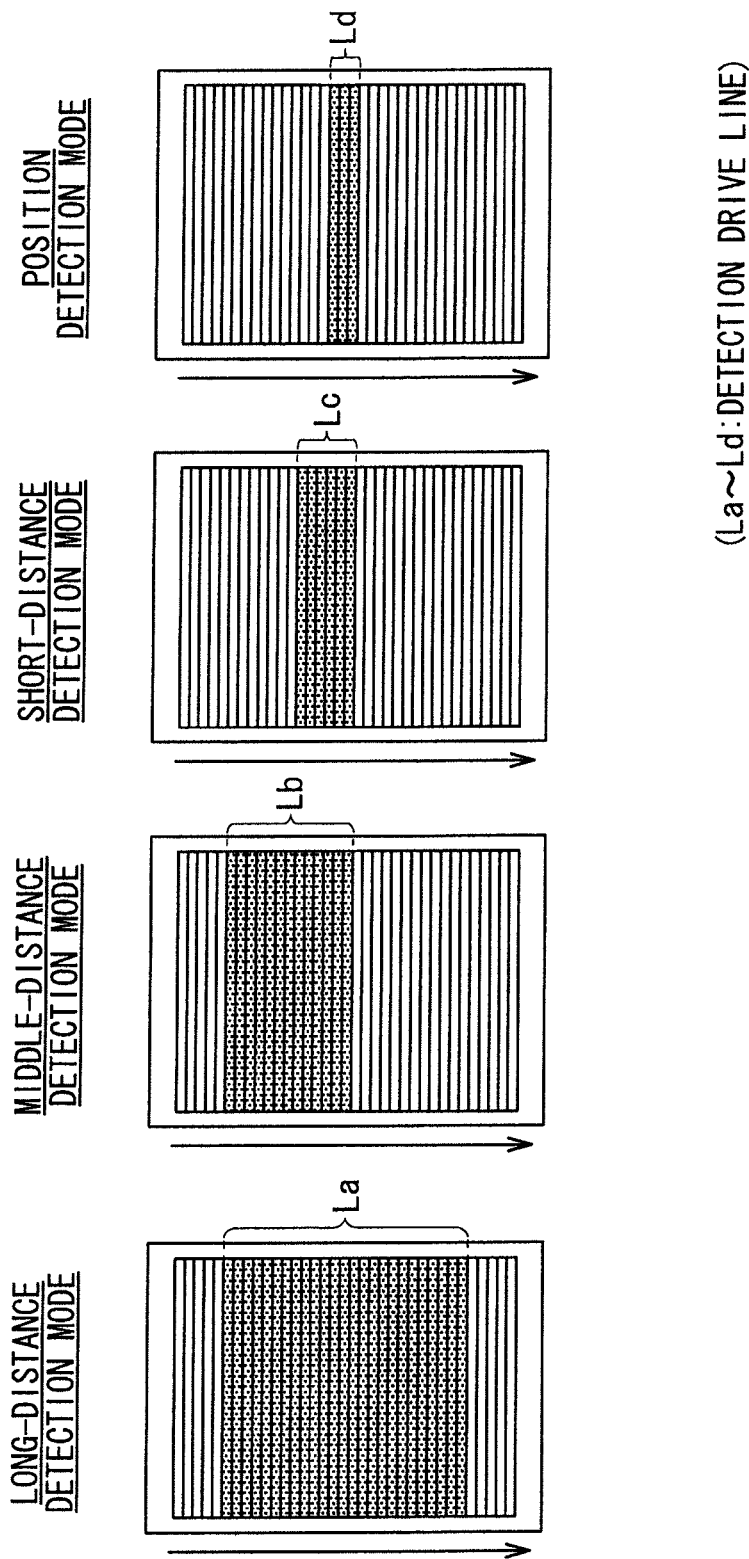

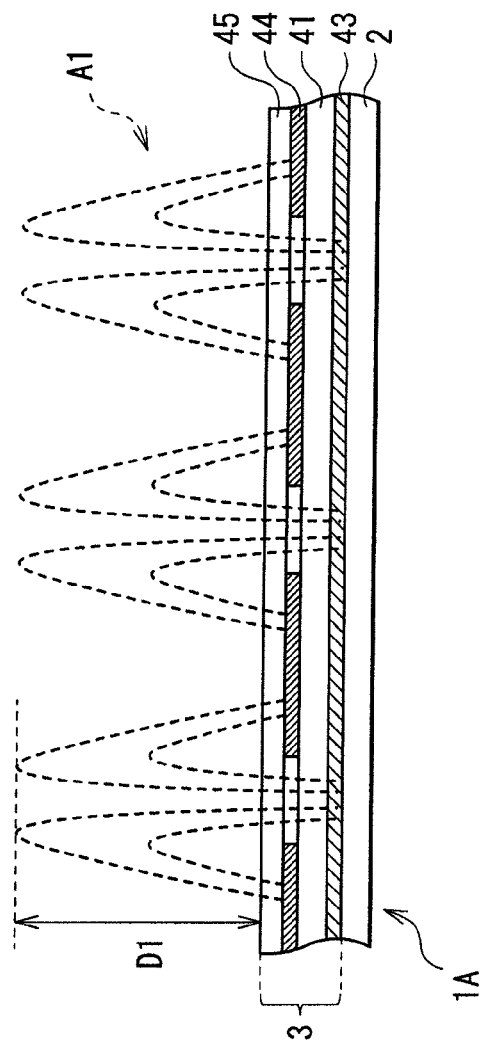
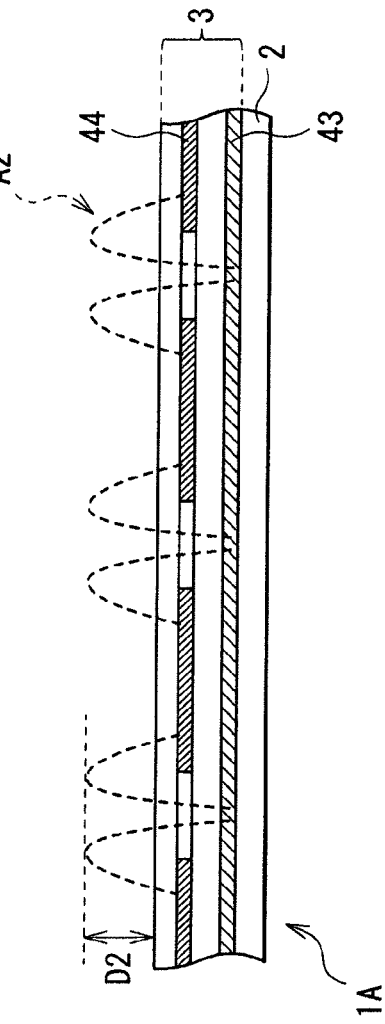
FIG. 11A
FIG. 11B

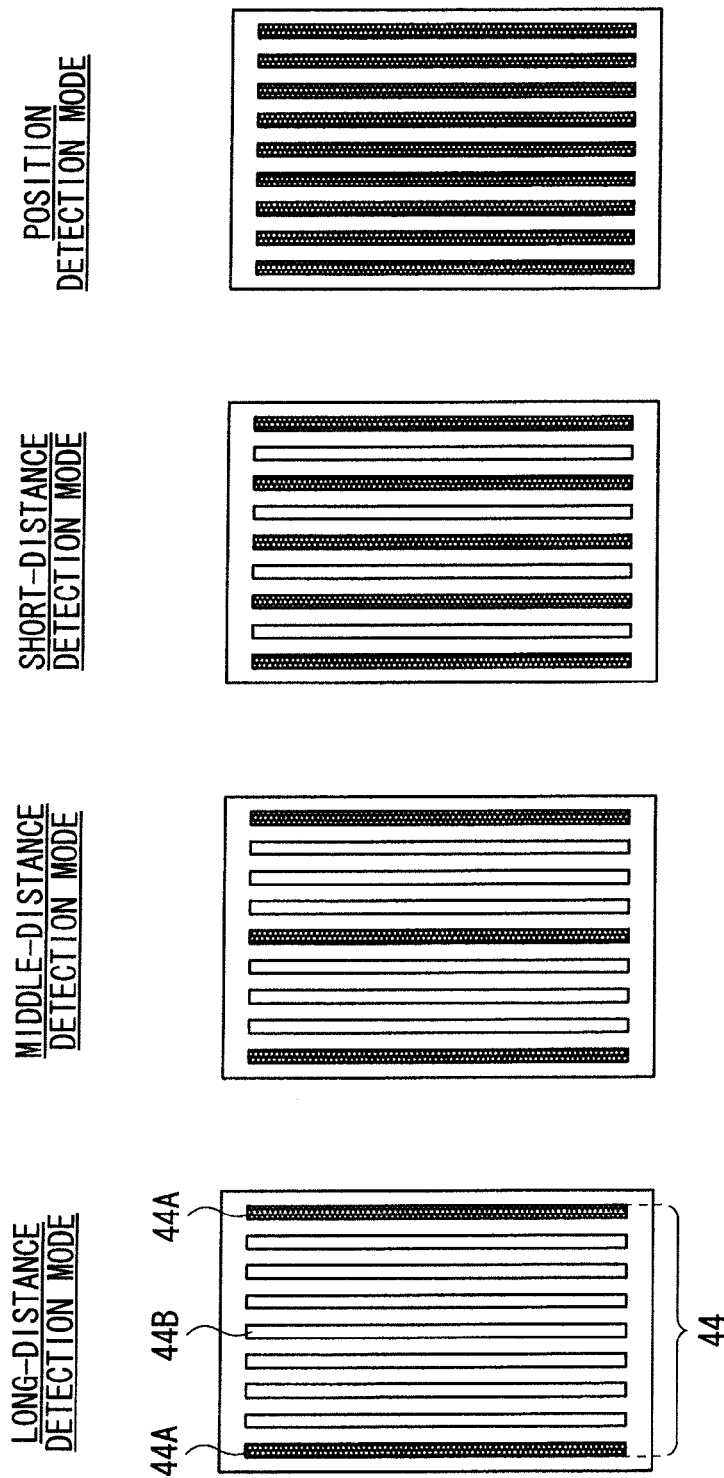

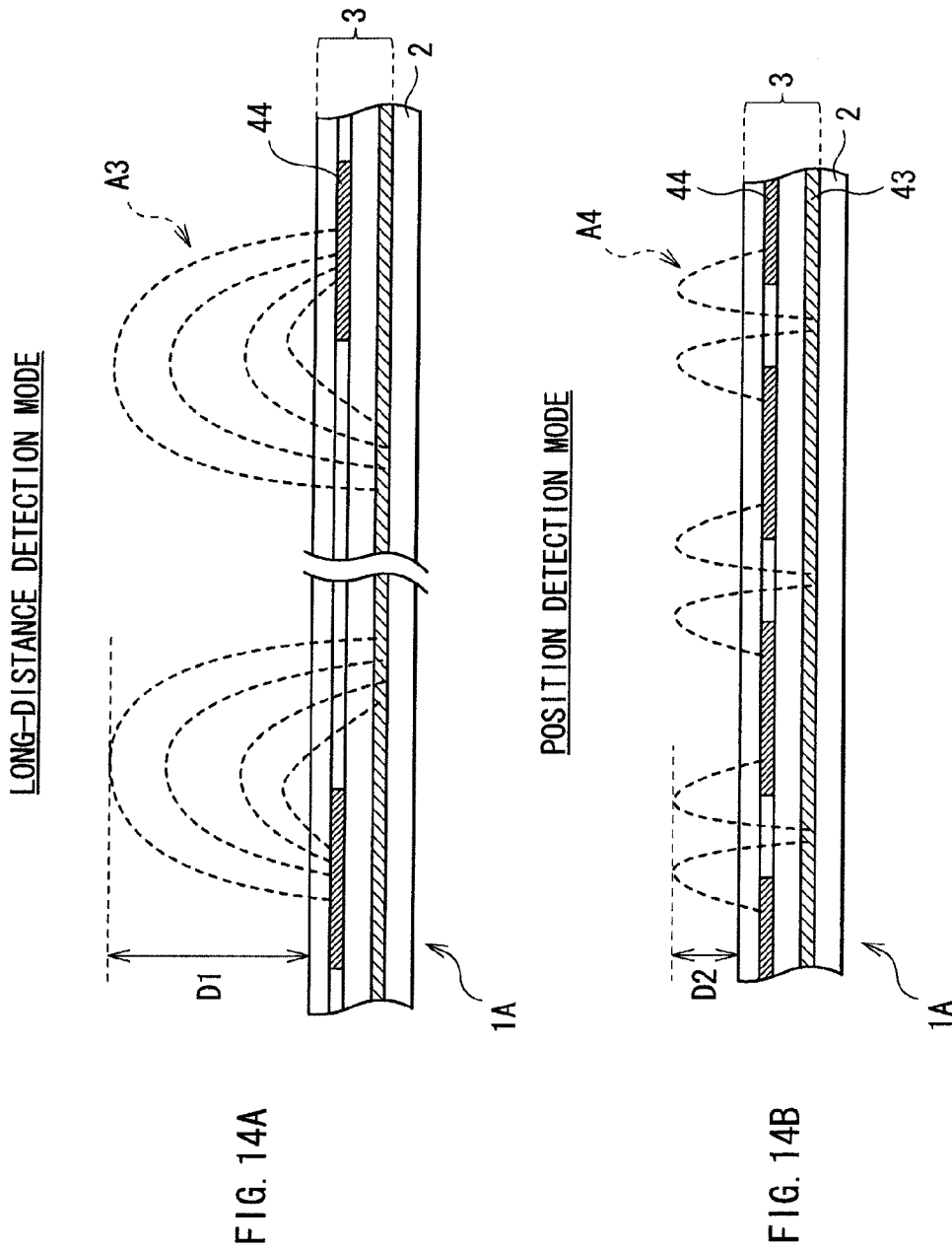

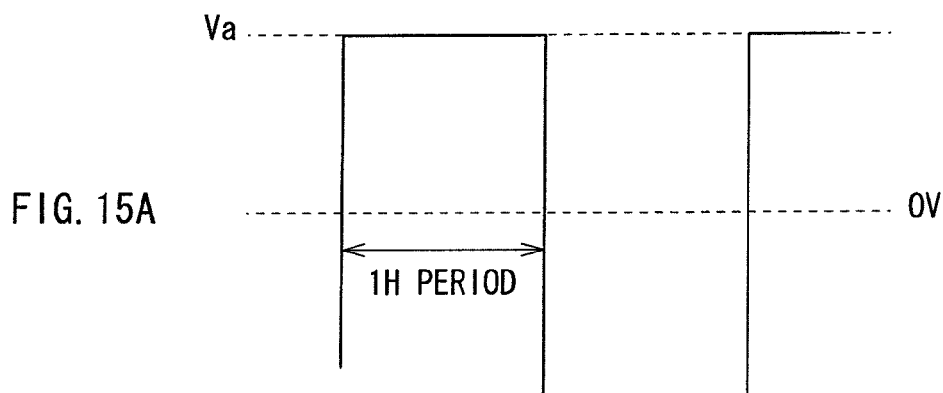
FIG. 15A LONG-DISTANCE DETECTION MODE
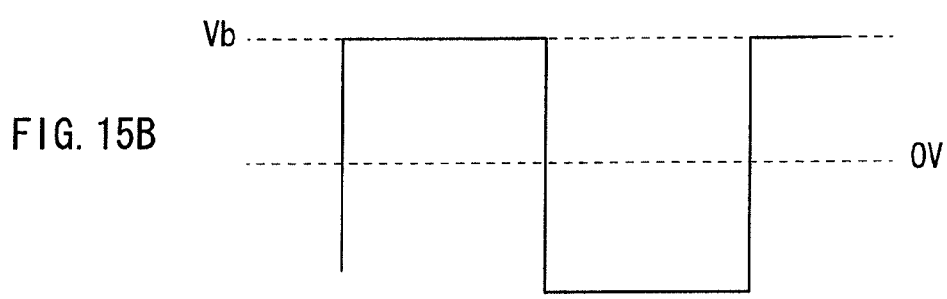
FIG. 15B MIDDLE-DISTANCE DETECTION MODE
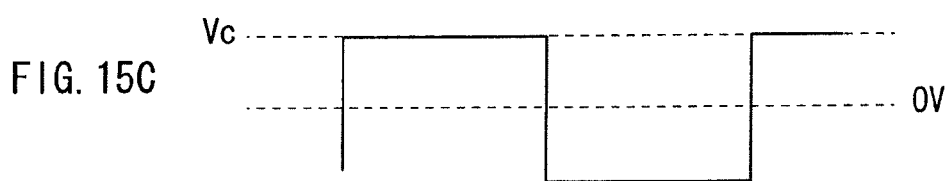
FIG. 15C SHORT-DISTANCE DETECTION MODE
FIG. 15D POSITION DETECTION MODE

VOLTAGE APPLICATION STATE (WHITE)

VOLTAGE NON-APPLICATION STATE (BLACK)

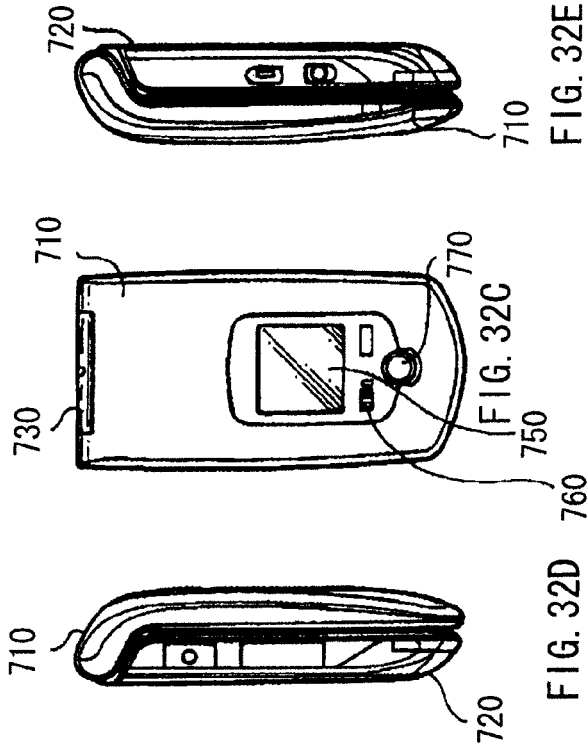
FIG. 32E
FIG. 32F
FIG. 32C
FIG. 32G
FIG. 32D
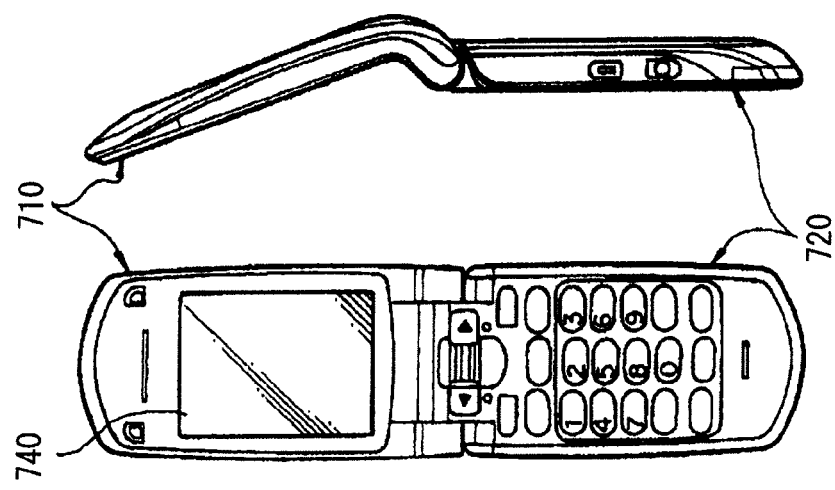
FIG. 32B
FIG. 32A

TOUCH SENSOR AND DISPLAY DEVICE

The subject matter of application Ser. No. 12/796,455, is incorporated herein by reference. The present application is a Continuation of U.S. Ser. No. 12/796,455, filed Jun. 8, 2010, which claims priority to claims priority to Japanese Patent Application No. JP2009-155827 filed in the Japanese Patent Office on Jun. 30, 2009 and Japanese Patent Application No. JP 2010-050483 filed in the Japanese Patent Office on Mar. 8, 2010, the entire content of which is hereby incorporated by references.

BACKGROUND OF THE INVENTION

1. Field of the Invention

The present invention relates to a display device such as liquid crystal display device, and particularly relates to a capacitance-type touch sensor that may be inputted with information by contact or approach of a user with a finger, and to a display device having such a touch sensor.

2. Description of Related Art

A display device is recently noticed, in which a contact detector, so-called touch panel, (hereinafter, called touch sensor) is directly attached onto a liquid crystal display device, and various button images are displayed on the liquid display device as a substitute for typical buttons so as to enable information input. In a trend of increase in size of a screen of a mobile device, this technique provides a great merit of space saving or reduction in number of components because a display arrangement may be combined with a button arrangement. However, the technique has had a difficulty that a touch sensor is attached and total thickness of a liquid crystal module is thus increased. Particularly, in a mobile device application, the following difficulty has occurred: since a protective layer is necessary for preventing scratches on the touch sensor, a liquid crystal module tends to be increased in thickness contrary to a trend.

Thus, for example, Japanese Patent Application Publication No. 2008-9750 proposes a liquid crystal display element with a touch sensor, on which a capacitance-type touch sensor is formed, for reducing thickness. In the liquid crystal display element, a conductive film for a touch sensor is provided between an observation-side substrate of a liquid crystal display element and a polarizing plate for observation disposed on an outer surface of the substrate, and the capacitance-type touch sensor using an outer surface of the polarizing plate as a touch surface is formed between the conductive film for a touch sensor and the outer surface of the polarizing plate.

SUMMARY OF THE INVENTION

However, in the liquid crystal display element with a touch sensor disclosed in Japanese Patent Application Publication No. 2008-9750, the conductive film for a touch sensor is principally necessary to be at the same potential as that of a user, and therefore the user needs to be securely grounded. Therefore, the liquid crystal display element is actually hard to be used for a mobile device application although the element may be used for a stationary television receiver that is supplied with power through an outlet. Moreover, in such a technique, circuit portions such as a touch sensor drive section and a coordinate detection circuit are structurally necessary to be separately provided from a display drive circuit section of the liquid crystal display element, and therefore overall circuits of a device are hardly integrated.

Thus, a touch detection electrode forming capacitance with a common electrode, which is originally provided for applying a display drive voltage, is considered to be provided in addition to the common electrode (display device having a newly structured, capacitance-type touch sensor). Since the capacitance changes depending on contact or approach of an object, if the display drive voltage applied to the common electrode by a display control circuit may be used (commonly used) even as a touch sensor drive signal, a detection signal depending on change in capacitance is obtained from the touch detection electrode. In addition, when the detection signal is inputted to a predetermined touch detection circuit, contact or approach of an object may be detected. Moreover, according to such a method, a display device with a touch sensor may be provided, the display device being adaptable for a mobile device application in which user potential is often unfixed. In addition, a display circuit and a sensor circuit are easily integrated on one circuit board, leading to an advantage that circuits are easily integrated.

However, while the capacitance-type touch sensor, including one in the Japanese Patent Application Publication No. 2008-9750 and the newly structured touch sensor, may detect contact or approach of an object, presence of an object is hardly detected in a place distant from the touch sensor (at a long distance). If an object at a long distance may be detected, information may be inputted at a position distant from the touch panel without touching the touch panel, therefore the touch sensor may be expected to be used for various applications. Therefore, a touch sensor, which may detect presence of an object at a long distance, is desired to be achieved.

It is desirable to provide a capacitance-type touch sensor that may detect presence of an object even in a place distant from the sensor, and a display device having such a touch sensor.

A touch sensor according to an embodiment of the invention includes one or more drive electrodes, one or more detection electrodes forming capacitance in cooperation with the respective drive electrodes, a detection circuit applying drive signals to the respective drive electrodes to detect an object based on detection signals obtained from the respective detection electrodes in response to the respective drive signals, and a controller controlling to change a range of electric flux lines generated between the drive electrodes and the detection electrodes.

A first display device according to an embodiment of the invention includes a plurality of display pixel electrodes, one or more common electrodes provided to face the display pixel electrodes, a display layer, a display control circuit controlling image display performance of the display layer through applying an image-signal-based-voltage between the display pixel electrodes and the common electrodes, and the touch sensor according to the embodiment of the invention.

A second display device according to an embodiment of the invention includes a plurality of display pixel electrodes, one or more common electrodes provided to face the display pixel electrodes, a display layer, a display control circuit controlling image display performance of the display layer through applying an image-signal-based-voltage between the display pixel electrodes and the common electrodes, one or more sensor-purpose drive electrodes, one or more sensor-purpose detection electrodes forming capacitance in cooperation with the respective sensor-purpose drive electrodes, and a detection circuit applying sensor-purpose drive signals to the respective sensor-purpose drive electrodes to detect an object based on detection signals obtained from the respective sensor-purpose detection electrodes in response to the respective sensor-purpose drive signals. The common electrodes also serve as the sensor-purpose drive electrodes, and the common electrodes are supplied with the sensor-purpose drive signal having a voltage larger than a voltage of the display-purpose common drive signal.

In the touch sensor and the first display device according to the embodiments of the invention, the (sensor) drive signal is applied to the drive electrode, thereby capacitance formed between the (sensor) drive electrode and the (sensor) detection electrode is changed depending on presence or absence of an object. A detection signal in accordance with such change in capacitance is obtained from the detection electrode. The controller changes a range of an electric line of force generated between the drive electrode and the detection electrode, thereby the detection circuit detects presence of an object based on a detection signal obtained in accordance with the range.

In the second display device according to the embodiment of the invention, the sensor drive signal is applied to the sensor drive electrode, thereby capacitance formed between the sensor drive electrode and the sensor detection electrode is changed depending on presence or absence of an object. A detection signal in accordance with such change in capacitance is obtained from the detection electrode. The common electrode for display is commonly used as the sensor drive electrode, and the common electrode is applied with a sensor drive signal being large compared with a common drive signal, thereby detection sensitivity is improved.

According to the touch sensor and the first display device of the embodiments of the invention, since the controller changes a range of an electric line of force generated between the drive electrode and the detection electrode, presence of an object may be detected not only in the case that the object contacts or approaches the touch sensor, but also in the case that the object is located in a place distant from the touch sensor. According to the second display device of the embodiment of the invention, since the common electrode for display is commonly used as the sensor drive electrode, and the common electrode is applied with a sensor drive signal being large compared with a common drive signal, detection sensitivity is improved and thus presence of an object may be detected even in a place distant from the touch sensor.

Other and further objects, features and advantages of the invention will appear more fully from the following description.

BRIEF DESCRIPTION OF THE DRAWINGS

FIGS. 4A to 4D are conceptual diagrams for illustrating a summary of each of detection modes of the display device according to the embodiment of the invention.

FIGS. 10A to 10D are schematic diagrams showing an example of line-sequential drive operation of the common electrode of the display device shown in FIG. 5.

FIGS. 11A and 11B are schematic diagrams for illustrating a range of each electric line of force in a long-distance detection mode and a position detection mode of the display device shown in FIG. 5.

FIGS. 13A to 13D are schematic diagrams showing an example of a detection electrode of a display device according to a second embodiment of the invention.

FIGS. 14A and 14B are schematic diagrams for illustrating a range of each electric line of force in a long-distance detection mode and a position detection mode of the display device shown in FIG. 13.

FIGS. 15A to 15D are schematic diagrams showing inverted waveforms of a detection drive signal according to a third embodiment of the invention.

FIG. 29A shows appearance of application example 2 as viewed from a surface side, and FIG. 29B shows appearance thereof as viewed from a back side.

FIGS. 32A to 32G are diagrams, where FIG. 32A is a front diagram of application example 5 in an opened state, FIG. 32B is a side diagram thereof, FIG. 32C is a front diagram of the example in a closed state, FIG. 32D is a left-side diagram thereof, FIG. 32E is a right-side diagram thereof, FIG. 32F is a top diagram thereof, and FIG. 32G is a bottom diagram thereof.

DETAILED DESCRIPTION OF THE PREFERRED EMBODIMENTS

Hereinafter, preferred embodiments of the invention will be described in detail with reference to drawings. Description is made in the following sequence.

1. Principle of touch detection method, and summary of each detection mode
2. First embodiment (example of gradually changing number of electrode patterns of common electrode (sensor drive electrode))
3. Second embodiment (example of gradually changing number of electrode patterns of sensor detection electrode)
4. Third embodiment (example of changing absolute value of sensor common-drive signal)
5. Fourth to Sixth embodiments
6. Modification 1 (example of external touch panel)
7. Modification 2 (example of providing sensor detection electrode on outer side of polarizing plate)
8. Modification 3 (example of using liquid crystal element of transverse electric mode as display element)
9. Application examples (application examples of display device with touch sensor to electronic devices)

Principle of Touch Detection Method

Figure 1:
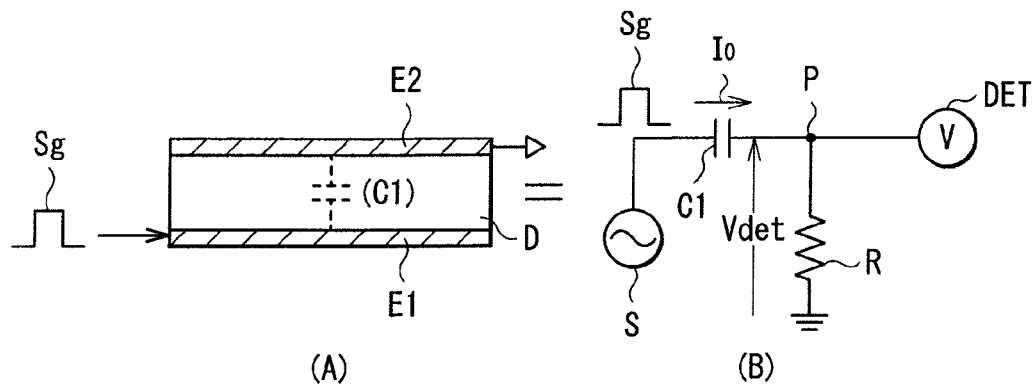
FIGS. 1A and 1B are diagrams for illustrating an operation principle of a display device with a touch sensor according to an embodiment of the invention, showing a noncontact state of a finger.
Figure 2:
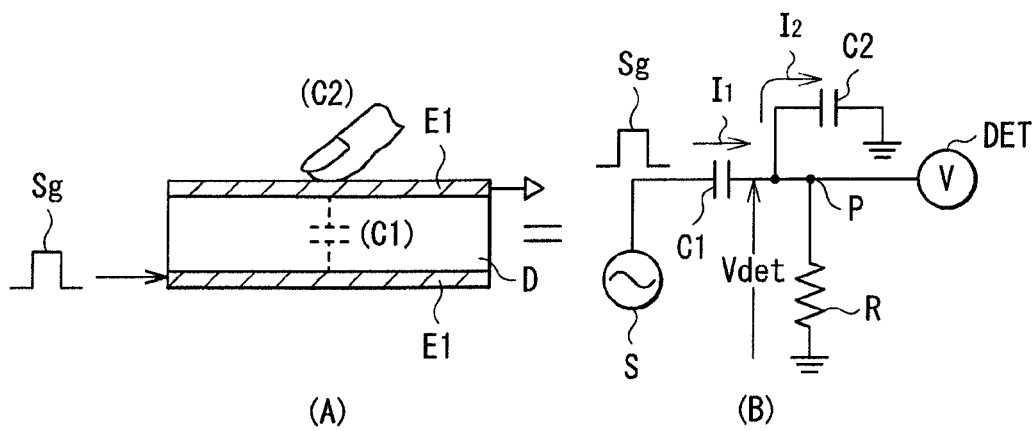
FIGS. 2A and 2B are diagrams for illustrating the operation principle of the display device with a touch sensor according to the embodiment of the invention, showing a contact state of a finger.
Figure 3:
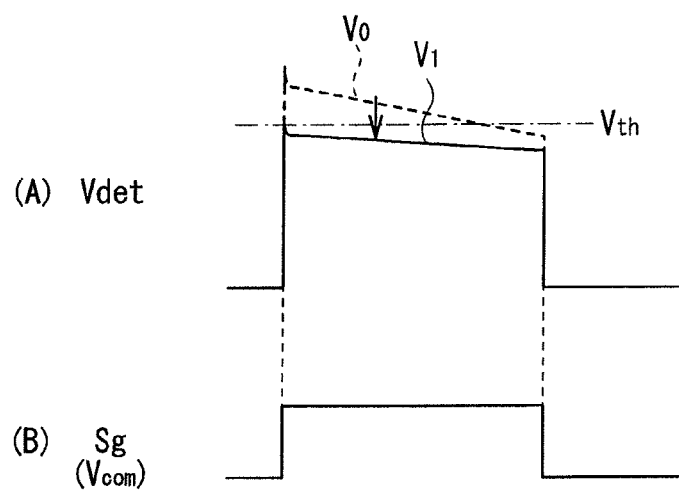
FIGS. 3A and 3B are diagrams for illustrating the operation principle of the display device according to the embodiment of the invention, showing an example of a waveform of each of a drive signal and a detection signal of the touch sensor.

First, a principle of a touch detection method of a display device according to an embodiment of the invention is described with reference to FIGS. 1A to 3B. The touch detection method is embodied as a capacitance-type touch sensor, in which, for example, as shown in FIG. 1A, a pair of electrodes (a drive electrode E1 and a detection electrode E2), which are opposed to each other with a dielectric D in between, are used to configure a capacitative element. Such a structure is represented as an equivalent circuit shown in FIG. 1B. The drive electrode E1, the detection electrode E2, and the dielectric D collectively configure a capacitative element C1. One end of the capacitative element C1 is connected to an AC signal source (drive signal source) S, and the other end P thereof is grounded via a resistor R and connected to a voltage detector (detection circuit) DET. When an AC square wave Sg (FIG. 3B) having a predetermined frequency (for example, about several to more than ten kilohertz) is applied from the AC signal source S to the drive electrode E1 (one end of the capacitative element C1), an output waveform (detection signal Vdet) as shown in FIG. 3A appears at the detection electrode E2 (the other end P of the capacitative element C1). The AC square wave Sg corresponds to a common drive signal Vcom described later in the embodiment.

In a noncontact (or non-approach) state of a finger, a current I0 corresponding to a capacitance value of the capacitative element C1 flows along with charge and discharge of the capacitative element C1 as shown in FIGS. 1A and 1B. At that time, a potential waveform at the other end P of the capacitative element C1 is, for example, as a waveform V0 in FIG. 3A, which is detected by the voltage detector DET.

In contrast, in a contact (or approach) state of a finger, a capacitative element C2 formed by the finger is added in series to the capacitative element C1 as shown in FIGS. 2A and 2B. In this state, a current I1 or I2 flows with charge and discharge of the capacitative element C1 or C2. At that time, a potential waveform at the other end P of the capacitative element C1 is, for example, as a waveform V1 in FIG. 3A, which is detected by the voltage detector DET. At that time, potential at a point P becomes a divided potential determined by values of the currents I1 and I2 flowing through the respective capacitance elements C1 and C2. Therefore, the waveform V1 has a small value compared with a value of the waveform V0 in the noncontact state. As described later, the voltage detector DET compares a detected voltage to a predetermined threshold voltage Vth, and when the detected voltage is equal to or higher than the threshold voltage, the voltage detector determines the state as a noncontact state, and when the detected voltage is lower than the threshold voltage, the voltage detector determines the state as a contact state. In this way, touch detection is enabled.

Summary of Detection Mode

Next, an example of detection modes of each of display devices of the following embodiments is described with reference to FIGS. 4A to 4D. In the display devices, particularly, when an object is located in a place distant from a display device (at a long distance) as shown in FIG. 4A, presence of an object is detected (long-distance detection mode). When an object contacts or approaches the display device as shown in FIG. 4D, a position (position coordinates) of the object is detected (position detection mode). Furthermore, gradual detection is performed even in intermediate distances between the long-distance detection mode and the position detection mode (a middle-distance detection mode and a short-distance detection mode). However, a distance (detectable distance), in which an object may be detected, and positional resolution are in a trade-off relationship as described later. That is, when presence of a more distant object is detected, positional resolution is reduced, and when a position of an object is detected more accurately, a detectable distance is decreased.

Each of the display devices is controlled such that a range of an electric line of force, which is formed between the drive electrode E1 and the detection electrode E2 described in the principle of the touch detection method, is changed so that the detection modes are gradually exhibited. When the range of the electric line of force extends over a long distance, the long-distance detection mode is used, and when the range remains within a short distance, the short-distance detection mode or the position detection mode is used. Hereinafter, specific measures to change such a range of an electric line of force are described in detail with embodiments and modifications.

First Embodiment

Configuration Example of Display Device 1A

Figure 5:
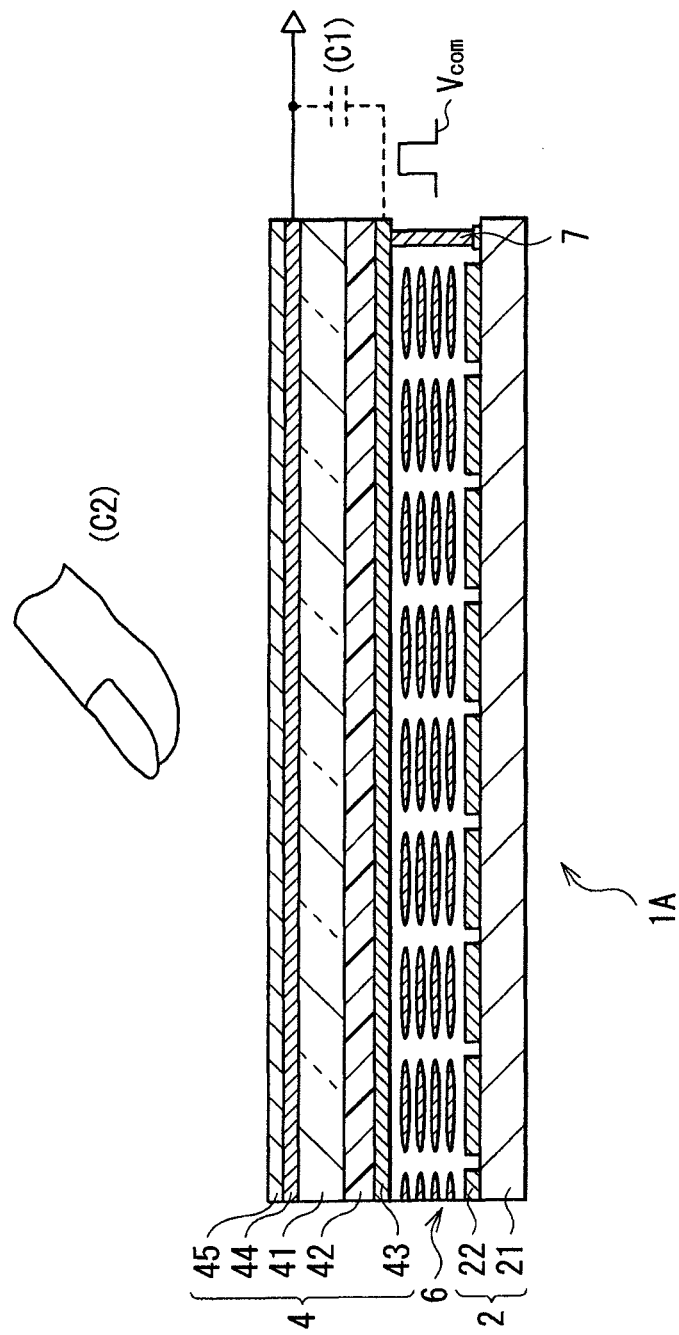
FIG. 5 is a section diagram showing a schematic structure of a display device according to a first embodiment of the invention.

FIG. 5 shows a relevant-part section structure of a display device 1A according to a first embodiment of the invention.

In the display device 1A, a liquid crystal display element is used as a display element, and part of an electrode (a common electrode 43 described later) originally provided in the liquid crystal display element and a display drive signal (common drive signal Vcom described later) are commonly used to configure a capacitance-type touch sensor. The display device 1A includes a pixel substrate 2, a counter substrate 4 disposed facing the pixel substrate 2, and a liquid crystal layer 6 inserted between the pixel substrate 2 and the counter substrate 4.

The pixel substrate 2 has a TFT substrate 21 as a circuit board, and a plurality of pixel electrodes 22 arranged in a matrix pattern on the TFT substrate 21. On the TFT substrate 21, a not-shown display driver and TFT (Thin Film Transistor) for driving each pixel electrode 22 are formed, and besides, lines are formed, including source lines (source lines 25 described later) supplying an image signal to each pixel electrode and gate lines (gate lines 26 described later) driving each TFT.

The counter substrate 4 has a glass substrate 41, a color filter 42 formed on one surface of the glass substrate 41, and the common electrode 43 formed on the color filter 42. The color filter 42 includes, for example, color filter layers of three colors of red (R), green (G) and blue (B), which are periodically arranged, where a set of RGB three colors is set in correspondence to each display pixel (pixel electrode 22). The common electrode 43 is used as a sensor drive electrode configuring part of a touch sensor performing touch detection operation, and corresponds to the drive electrode E1 in FIGS. 1A and 1B.

The common electrode 43 is connected to the TFT substrate 21 by a contact conduction pole 7. The common drive signal Vcom having an AC square waveform is applied from the TFT substrate 21 to the common electrode 43 via the contact conduction pole 7. The common drive signal Vcom, which defines a pixel voltage applied to the pixel electrode 22 and a display voltage of each pixel, is commonly used as a drive signal of the touch sensor, and corresponds to the AC square wave Sg supplied from the drive signal source S in FIGS. 1A and 1B. That is, the common drive signal Vcom is reversed in polarity at each predetermined cycle.

A sensor detection electrode 44 is formed on the other surface of the glass substrate 41, and furthermore, a polarizing plate 45 is disposed on the sensor detection electrode 44. The sensor detection electrode 44, which configures part of the touch sensor, corresponds to the detection electrode E2 in FIGS. 1A and 1B.

The liquid crystal layer 6 modulates light passing through the layer 6 depending on a state of an electric field, and various modes of liquid crystal are used for the layer 6, including TN (Twisted Nematic), VA (Vertical Alignment), and ECB (Electric-Field Control Birefringence) modes.

An alignment film is disposed between the liquid crystal layer 6 and the pixel substrate 2, and between the liquid crystal layer 6 and the counter substrate 4 respectively, and an incidence-side polarizing plate is disposed on a bottom side of the pixel substrate 2, those being omitted to be shown.

Configuration Example of Pixel Structure and Driver

Figure 6:
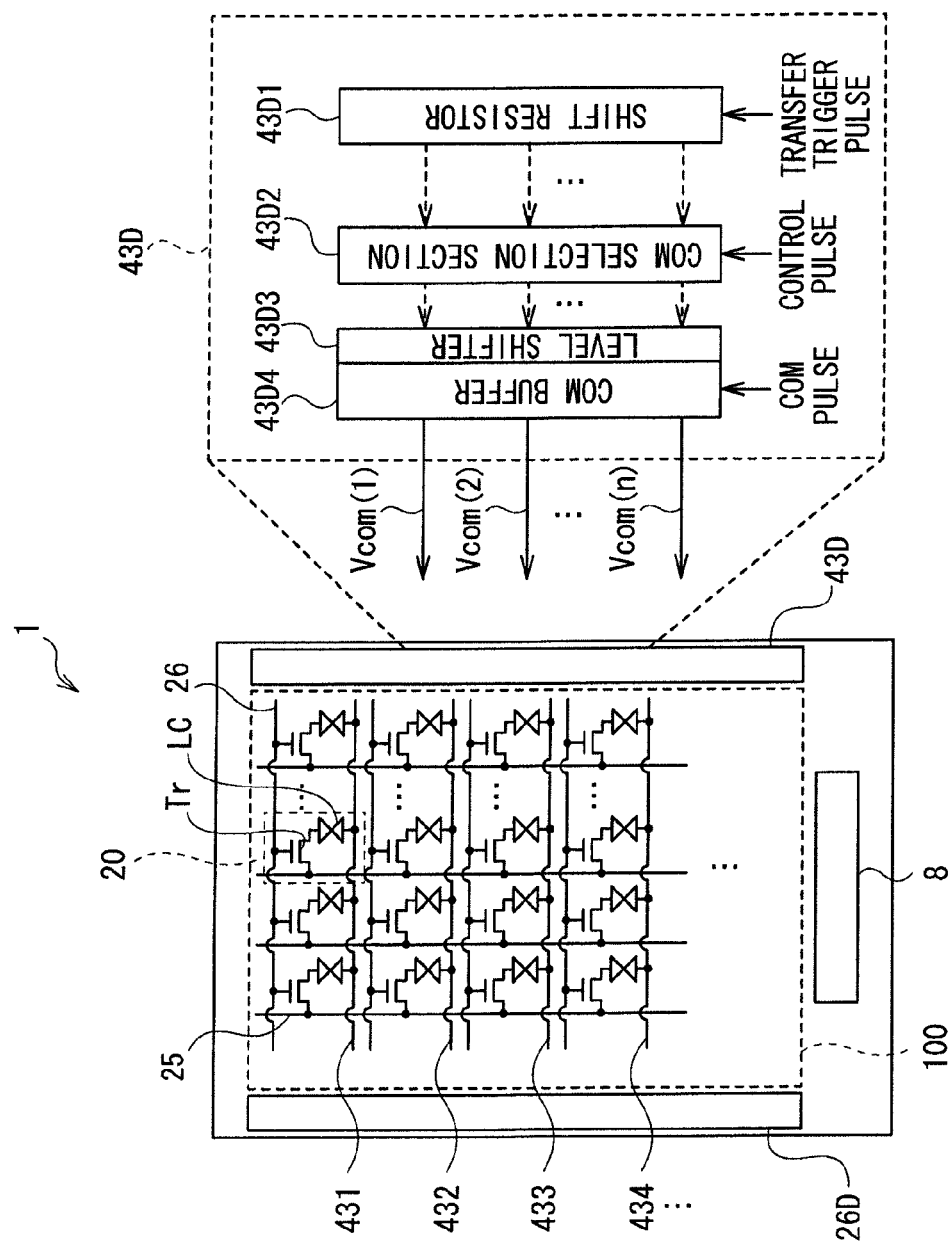
FIG. 6 is a block diagram showing an example of a detailed configuration of each of a pixel structure and a driver of the display device shown in FIG. 5.

FIG. 6 shows a configuration example of a pixel structure and various drivers of the display device 1A. In the display device 1A, a plurality of pixels (display pixels 20), each display pixel having a TFT element Tr and a liquid crystal element LC, are arranged in a matrix pattern in an effective display area 100.

Each display pixel 20 is connected with a gate line 26 connected to a gate driver 26D, a signal line (source line) 25 connected to a not-shown source driver, and each of common electrodes 431 to 43n connected to a common electrode driver 43D. The common electrode driver 43D sequentially supplies the common drive signals Vcom (Vcom(1) to Vcom(n)) to the common electrodes 431 to 43n as described before. The common electrode driver 43D has, for example, a shift resistor 43D1, a COM selection section 43D2, a level shifter 43D3, and a COM buffer 43D4.

The shift resistor 43D1 is a logic circuit for sequentially transferring input pulses. The COM selection section 43D2 is a logic circuit controlling whether or not the common drive signal Vcom is outputted to each display pixel 20 within the effective display area 100, and controls output of the common drive signal Vcom depending on a position in the effective display area 100. The level shifter 43D3 is a circuit for shifting a control signal supplied from the COM selection section 43D2 to a potential level enough to control the common drive signal Vcom. The COM buffer 43D4 is a final output logic circuit for sequentially supplying common drive signals Vcom (Vcom(1) to Vcom(n)), and includes an output buffer circuit or a switch circuit.

Configuration Example of Common Electrode 43 and Sensor Detection Electrode 44

Figure 7:
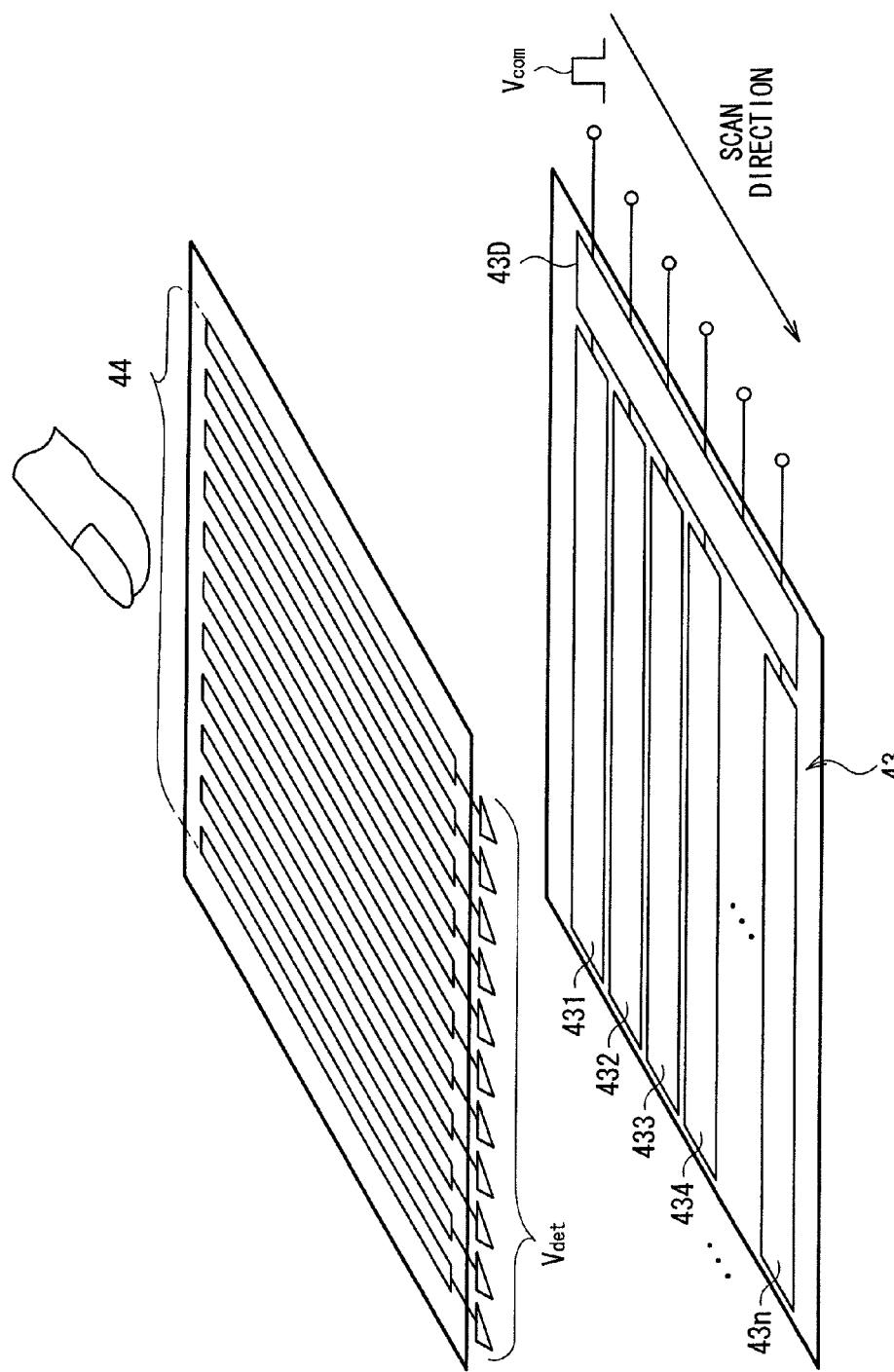
FIG. 7 is a perspective diagram showing a configuration example of relevant parts (a common electrode and a sensor detection electrode) of the display device shown in FIG. 5.

FIG. 7 shows an example of the common electrode 43 and the sensor detection electrode 44 on the counter substrate 4. The common electrode 43 is divided into a plurality of stripe electrode patterns (hereinafter called drive electrode patterns) extending in a right-to-left direction in the figure. Here, the common electrode 43 is divided into n (n: an integer of 2 or more) electrode patterns 431 to 43n. The electrode patterns are scanned while being sequentially supplied with the common drive signals Vcom by the common electrode driver 43D.

However, in the embodiment, when electrode patterns are sequentially driven, the patterns are driven along a scan direction while the drive signals Vcom is applied by one or at least two, selective electrode patterns. Specifically, a selective number of electrode patterns of the common electrode 43 are bundled, and line sequential drive is performed with such a bundle of electrode patterns as a unit drive line. A selective number of drive electrode patterns of the unit drive line may be changed in accordance with control of a controller 5 described later.

The sensor detection electrode 44 includes a plurality of stripe electrode patterns (hereinafter, called detection electrode patterns) extending in a direction perpendicular to an extending direction of the drive electrode patterns of the common electrode 43. A detection signal Vdet is outputted from each detection electrode pattern, and inputted to a detection circuit 8 described later.

In this way, each drive electrode pattern of the common electrode 43 and each detection electrode pattern of the sensor detection electrode 44 extend in directions perpendicular to each other, thereby a sensor as a whole may detect a position of an object as matrix coordinates. Thus, for example, detailed position coordinates of an object may be obtained in a mode (position detection mode) where the common electrode 43 is sequentially driven by certain drive electrode patterns in a time-divisional manner. Moreover, in this case, detection of touch by multiple persons or multiple fingers (so-called, multi-touch) may be achieved.

Controller 5 and Detection Circuit 8

Figure 8:
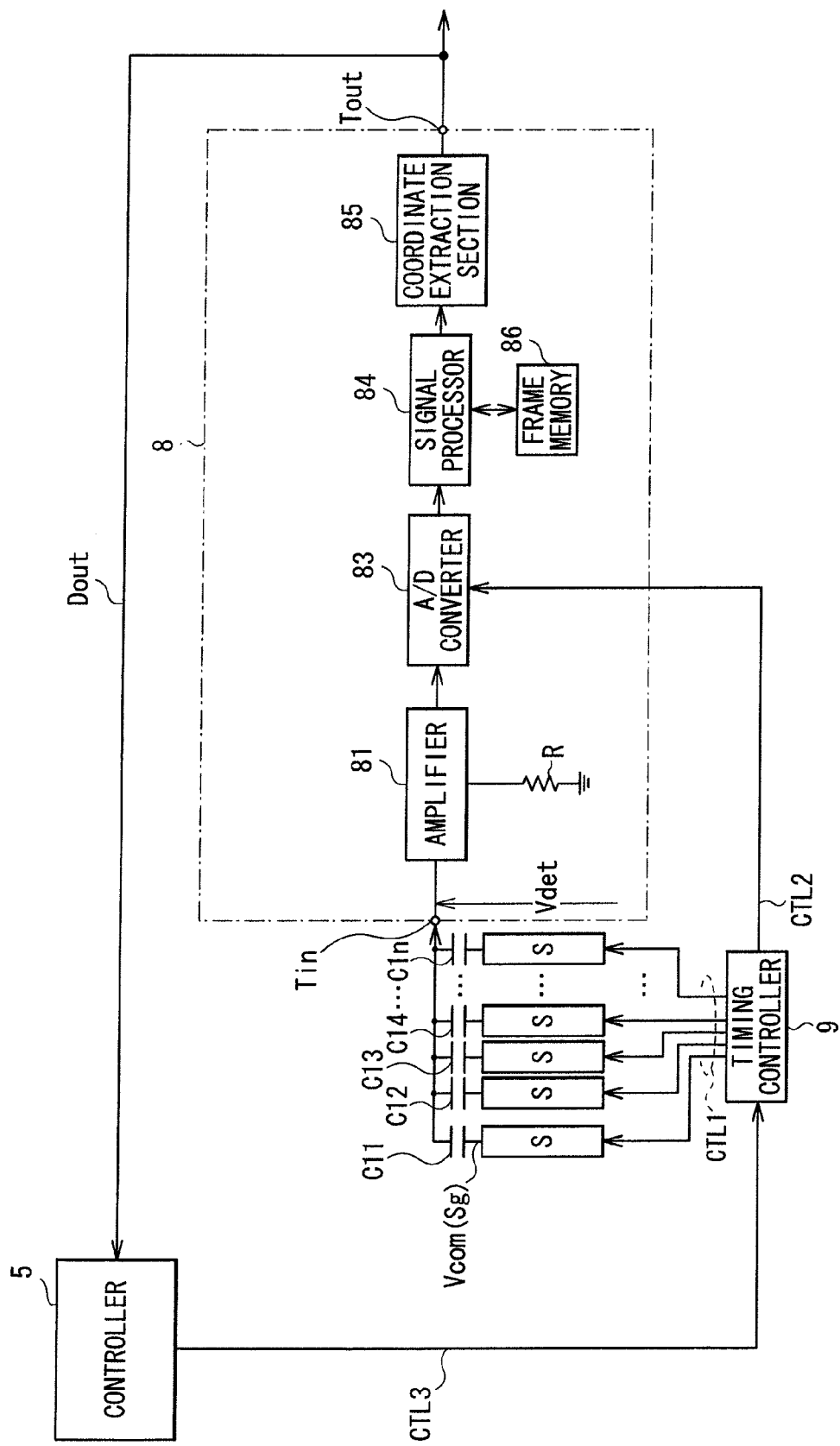
FIG. 8 is a circuit diagram showing a configuration example of a detection circuit and the like of the display device shown in FIG. 5.

FIG. 8 shows a functional block configuration of the detection circuit 8 for touch detection operation, a timing controller 9 as a timing generator, and the controller 5. In the embodiment, the controller 5 drives the timing controller 9 based on a detection signal Dout outputted from the detection circuit 8. The timing controller 9 is a specific example of each of first to third timing controllers of embodiments of the invention.

In FIG. 8, capacitance elements C11 to C1n correspond to (electrostatic) capacitance elements formed between the common electrodes 431 to 43n and the sensor detection electrode 44 as shown in FIG. 7. The capacitance elements C11 to C1n are connected to the drive signal source S for supplying the common drive signal Vcom (Sg).

The detection circuit 8 (voltage detector DET) has, for example, an amplifier 81, an A/D (analog/digital) converter 83, a signal processor 84, a frame memory 86, a coordinate extraction section 85 and a resistor R. An input terminal Tin of the detection circuit 8 is commonly connected to the other end side (sensor detection electrode 44 side) of each of the capacitance elements C11 to C1n.

The amplifier 81 amplifies a detection signal Vdet inputted from the input terminal Tin, and has an operational amplifier for signal amplification, a capacitor and the like. The resistor R is disposed between the amplifier 81 and the earth. The resistor R avoids a floating state of the sensor detection electrode 44 to keep a stable state. This avoids fluctuation of a signal value of the detection signal Vdet in the detection circuit 8, and besides, leads to an advantage that static electricity may be escaped to the earth via the resistor R.

The A/D converter 83 is a section converting the analog detection signal Vdet amplified by the amplifier 81 into a digital detection signal, and includes a not-shown comparator. The comparator compares electric potential of an inputted detection signal to electric potential of a predetermined threshold voltage Vth (see FIG. 3). Sampling timing in A/D conversion by the A/D converter 83 is controlled by a timing control signal CTL2 supplied from the timing controller 9.

The signal processor 84 performs predetermined signal processing (for example, digital noise removal processing, or processing of converting frequency information into positional information) to a digital detection signal outputted from the A/D converter 83.

The coordinate extraction section 85 obtains information on presence of an object, or obtains a position (coordinates) of an object based on a detection signal outputted from the signal processor 84, and outputs such information or the like as a detection result (detection signal Dout) from an output terminal Tout.

Such a detection circuit 8 may be formed in a peripheral region (non-display region or frame region) on the counter substrate 4, or may be formed in a peripheral region of the pixel substrate 2. However, the detection circuit 8 is preferably formed on the pixel substrate 2 from a viewpoint of simplification of circuits and the like by integration thereof because the detection circuit may be integrated with various circuit elements for display control originally formed on the pixel substrate 2. In this case, it is enough that each electrode pattern of the sensor detection electrode 44 is connected to the detection circuit 8 on the pixel substrate 2 by a contact conduction pole (not shown) similar to the contact conduction pole 7 so that the detection signal Vdet is transmitted from the sensor detection electrode 44 to the detection circuit 8.

The controller 5 outputs a control signal CTL3 to the timing controller 9 based on the detection signal Dout outputted from the detection circuit 8. Specifically, when the controller obtains a determination result that an object is present as a detection result Dout, the controller performs control of decreasing a selective number of drive electrode patterns of a unit drive line as described in detail later. Such control operation is continuously performed, so that the described detection modes (the long-distance detection mode to the position detection mode) are gradually exhibited.

Operation and Effects of Display Device 1A

Next, operation and effects of the display device 1A of the embodiment are described.

Basic Operation

In the display device 1A, the display driver (common electrode driver 43D) on the pixel substrate 2 line-sequentially supplies the common drive signal Vcom to the drive electrode patterns (common electrodes 431 to 43n) of the common electrode 43. Moreover, the display driver supplies a pixel signal (an image signal) to each pixel electrode 22 via a source line 25, and synchronously controls switching of TFT (TFT element Tr) of each pixel electrode via a gate line 26 in a line-sequential manner. Thus, the liquid crystal layer 6 is applied with an electric field in a longitudinal direction (in a direction perpendicular to the substrate), the electric field being determined by the common drive signal Vcom and each image signal, for each of display pixels 20, so that a liquid crystal state is modulated. In this way, display is performed by so-called inversion driving.

On the other hand, on a counter substrate 4 side, capacitance elements C1 (capacitance elements C11 to C1n) are formed in interconnections between the drive electrode patterns of the common electrode 43 and the detection electrode patterns of the sensor detection electrode 44. For example, when the common drive signal Vcom is time-dimensionally applied to the drive electrode patterns of the common electrode 43 as shown by an arrow (scan direction) in FIG. 7, the following operation is performed. That is, each of the capacitance elements C11 to C1n in one or multiple arrays is charged or discharged, the capacitance elements being formed in interconnections between the drive electrode patterns applied with the common drive signal Vcom and the detection electrode patterns. As a result, a detection signal Vdet having a size corresponding to a capacitance value of the capacitance element C1 is outputted from each electrode pattern of the sensor detection electrode 44. In a state where a user finger or the like is not present on a surface side of the counter substrate 4, size of the detection signal Vdet is substantially constant. An array of the capacitance elements C1 to be an object of charge or discharge is sequentially moved with scan of the common drive signal Vcom.

At that time, when a user finger is touched to the counter substrate 4, a capacitance element C2 caused by the finger is added to the capacitance element C1 that has been originally formed in such a touch region. As a result, a value of a detection signal Vdet at a time point when the touch region is scanned (namely, a time point when the common drive signal Vcom is applied to a drive electrode pattern corresponding to the touch region among all drive electrode patterns of the common electrode 43) becomes smaller than a value in another region. The detection circuit 8 compares a voltage of the detection signal Vdet to the threshold voltage Vth, and when the voltage of the detection signal is lower than the threshold voltage Vth, the detection circuit determines the relevant region as the touch region. The touch region may be calculated from application timing of the common drive signal Vcom and detection timing of a detection signal Vdet having a voltage lower than the threshold voltage Vth.

Figure 9:
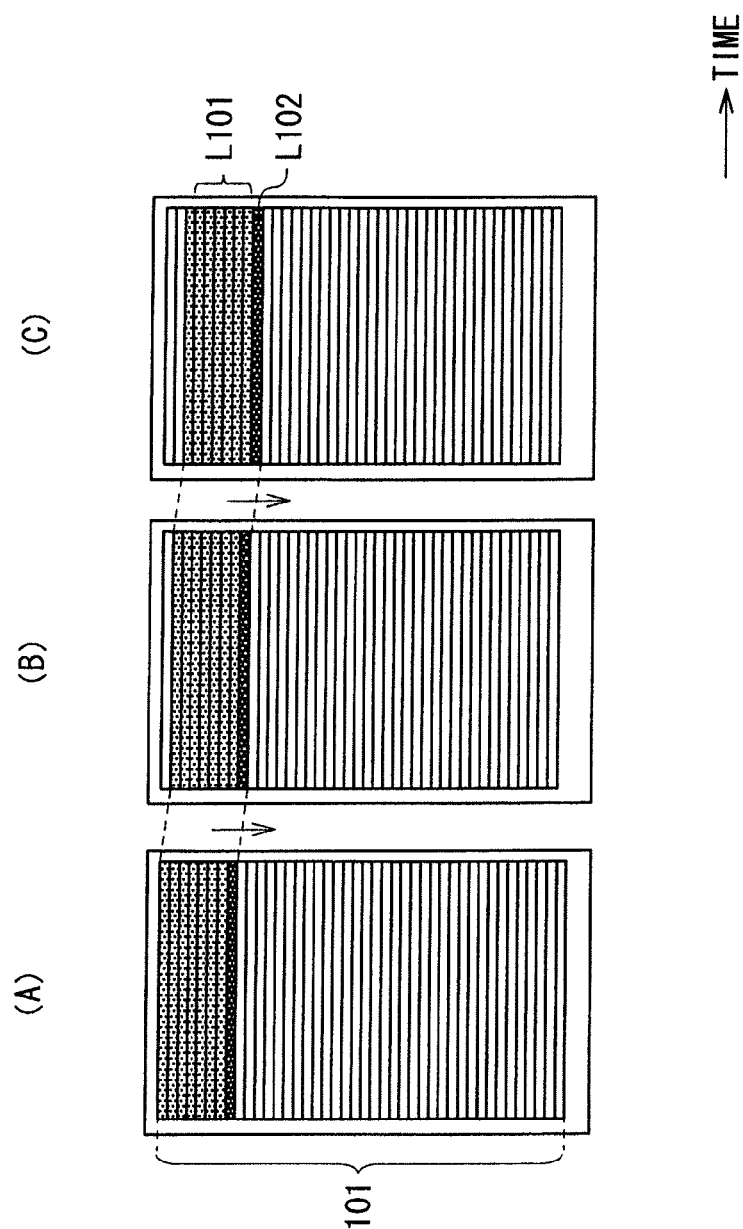
FIGS. 9A to 9C are schematic diagrams showing an example of line-sequential drive operation of a common electrode according to a comparative example.

Here, line-sequential drive operation of the common electrode 43 in the embodiment is described in detail in comparison with a comparative example. First, line-sequential drive operation of a common electrode 101 according to the comparative example is described with reference to FIGS. 9A to 9C.

Line-Sequential Drive Operation in Comparative Example

In the comparative example, line-sequential drive for detection is performed in such a manner that part of drive electrode patterns of a common electrode 101 are bundled, and such a bundle of drive electrode patterns is used as a unit drive line (detection drive line L101). On the other hand, line-sequential drive for display is performed in such a manner that a small number of (here, one) drive electrode patterns are used as a display drive line (L102). At that time, the number of the drive electrode patterns of the detection drive line L101 is a fixed value. However, in such a comparative example, while presence of an object such as a finger may be detected in the case that the object is in a contact (approaching) state, an object is hardly detected in a place by a certain distance away from the object (long distance detection).

Thus, in the embodiment, it is noticed that a detectable distance of an object is closely relates to a range of an electric line of force generated between the common electrode 43 and the detection electrode 44, and such a relationship is successfully used for long distance detection of an object. Specifically, the range of the electric line of force is expanded so as to cover a more distant area, thereby a more distant object may be detected. In addition, the range of the electric line of force is changed, so that objects at various distances may be detected. In the embodiment, the following line-sequential drive operation (line-sequential drive operation for detection) of the common electrode 43 is performed as a specific measure to change the range of the electric line of force.

Line-Sequential Drive Operation in the Embodiment

FIGS. 10A to 10D schematically show an example of line-sequential drive operation of the common electrode 43 according to the embodiment. The display device 1A sequentially exhibits four detection modes in total of the long-distance detection mode, the middle-distance detection mode, the short-distance detection mode and the position detection mode. In the embodiment, line-sequential drive operation is performed in a different way in each of the detection modes. That is, the common electrode 43 is controlled such that a selective number of drive electrode patterns of each of unit drive lines (detection drive lines La to Ld) of the common electrode 43 in each detection mode is gradually decreased from the long-distance detection mode to the position detection mode.

Specifically, in the long-distance detection mode, the total number or a number close to the total number of drive electrode patterns of the common electrode 43 are selected as a detection drive line La. In contrast, in the position detection mode, one drive electrode pattern or a number close to one of drive electrode patterns of the common electrode 43 is selected as a detection drive line Ld. In the middle-distance detection mode, a smaller number of the drive electrode patterns than that in the long-distance detection mode, for example, less than half (here, about one third of) the drive electrode patterns are selected as a detection drive line Lb. In the short-distance detection mode, approximately the same number as in the position detection mode, or a slightly larger number of the drive electrode patterns are selected as a detection drive line Lc.

Here, operation caused by such a difference in selective number of the drive electrode patterns between the detection drive lines La to Ld is described with reference to FIGS. 11A and 11B. FIGS. 11A and 11B show a sectional structure of the display device 1A in a simplified manner. However, the long-distance detection mode having the largest selective-number of the drive electrode patterns (FIG. 11A), and the position detection mode having the smallest selective-number of the drive electrode patterns (FIG. 11B) are shown as an example herein. In each figure, while a locus of an electric line of force (A1 or A2) is shown by a dotted line, which does not strictly express an actual electric line of force, but schematically expresses the electric line of force for illustrating a range of the electric line.

For example, in the long-distance detection mode, as shown in FIG. 11A, since the selective number of the drive electrode patterns of the detection drive line La is large, a range of the electric line of force A1 generated between the common electrode 43 and the sensor detection electrode 44 spreads to a great distance. As a result, the electric line of force A1 extends to a point at a distance D1 from a top of the display device 1A (surface of a polarizing plate 45). Thus, when an object is present in one of points from the top of the display device 1A to the point at a distance D1 from the top, a change occurs in the detection signal Vdet outputted from the sensor detection electrode 44, and thus a determination result that an object is present is outputted as the detection signal Dout. However, in the long-distance detection mode, while a distant object may be detected, a disposed area of the object is hardly specified.

On the other hand, in the position detection mode, as shown in FIG. 11B, since the selective number of the drive electrode patterns of the detection drive line Ld is small, a range of the electric line of force A2 generated between the common electrode 43 and the sensor detection electrode 44 extends only to a point at a distance D2 (D2<<D1) from the top of the display device 1A. Therefore, while presence of an object may be determined in a region near the top of the display device 1A, the object is hardly detected at a point distant from the display device 1A unlike in the long-distance detection mode. In contrast, in the position detection mode, since the selective number of the drive electrode patterns is set to one or a number close to one (namely, line-sequential drive is performed with subdivided unit drive lines in a time-sequential manner), a disposed area (position coordinates) of an object may be detected in detail.

Similarly, in the middle-distance detection mode or the short-distance detection mode, an object may be detected up to a point at a distance in accordance with a selective number of drive electrode patterns of the detection drive line Lb or Lc. In this way, a range of an electric line of force is changed depending on a selective number of the drive electrode patterns of a unit drive line. Specifically, as the selective number of the drive electrode patterns is larger, the range of the electric line of force is expanded, and thus a detectable distance is increased. In contrast, as the selective number is smaller, the range of the electric line of force is reduced, and thus the detectable distance is decreased. On the other hand, position resolution becomes higher with decrease in selective number of the drive electrode patterns, and becomes lower with increase in selective number of the patterns.

Therefore, in the long-distance detection mode, presence of an object at a long distance is determined. In the middle-distance detection mode, presence of an object at a middle distance is determined, and when an object is present, a disposed area of the object is approximately specified. In the short-distance detection mode, presence of an object at a short distance is determined, and when an object is present, a disposed area of the object is specified. In the position detection mode, presence of an object contacting or approaching the display device is determined, and when an object is present, a disposed area of the object is acquired as position coordinates in an XY matrix. That is, the detectable distance and the position resolution are in a trade-off relationship.

The controller 5 gradually changes the selective number of the drive electrode patterns of each of detection drive lines La to Ld in accordance with the detection result Dout outputted from the detection circuit 8 so that the detection modes are gradually exhibited. Specifically, the controller 5 sets the long-distance detection mode as an initial mode, and sequentially changes the detection mode to the middle-distance detection mode, the short-distance detection mode, or the position detection mode in accordance with the detection result Dout so that each detection mode is exhibited. Hereinafter, a procedure of changing each of the detection modes is described with reference to FIG. 12.

Figure 12:
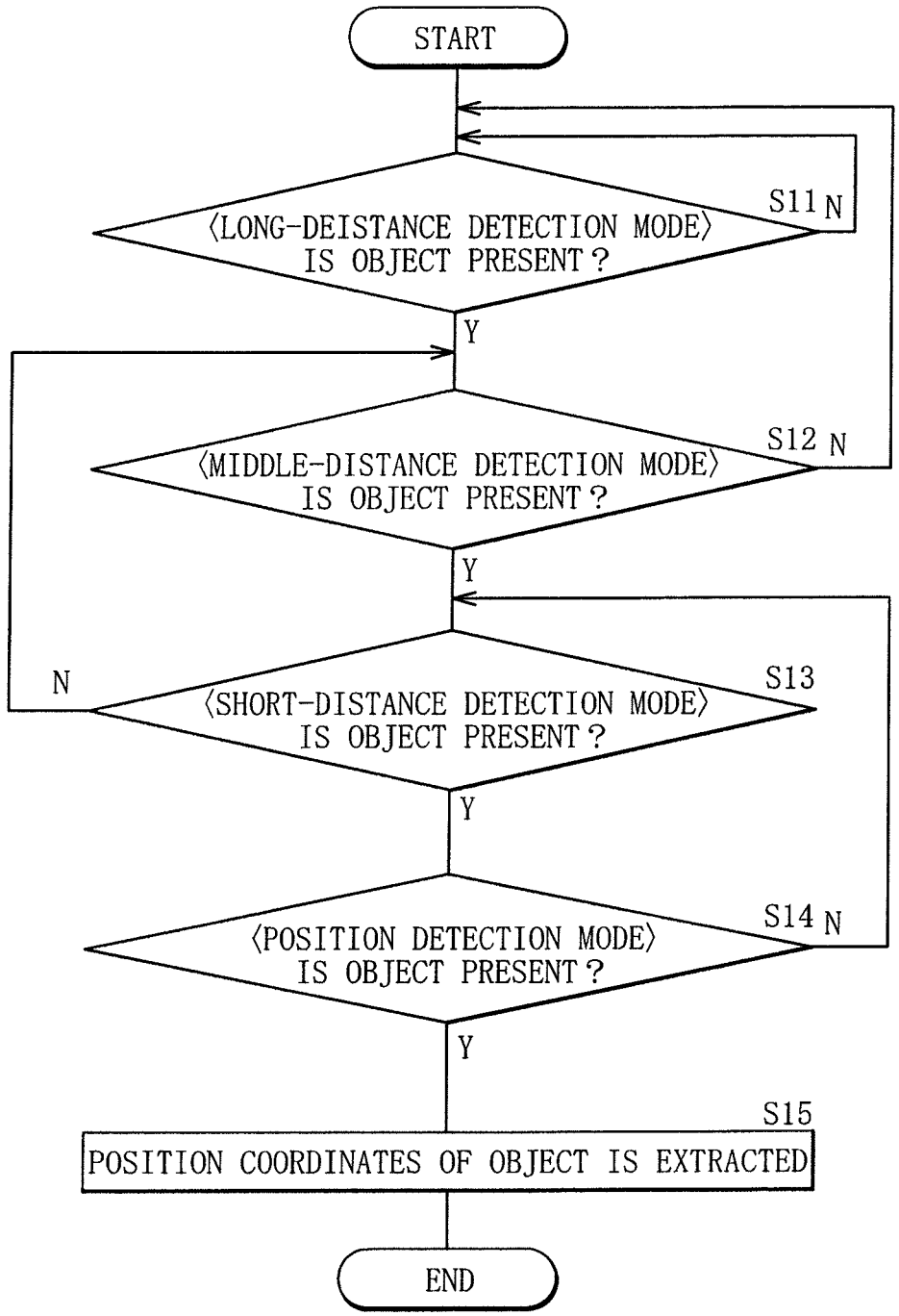
FIG. 12 is a flowchart showing detection-mode change operation of the display device shown in FIG. 5.

Specifically, as shown in FIG. 12, first, the controller determines presence of an object in the long-distance detection mode (step S11), and when an object is present (step S11: Y), the controller performs control of decreasing the selective number of the drive electrode patterns from the detection drive line La to the detection drive line Lb. Thus, the long-distance detection mode is shifted to the middle-distance detection mode. When an object is not present (step S11: N), the controller performs control of continuing the long-distance detection mode (namely, control of keeping the selective number of the drive electrode patterns of the detection drive line La).

Next, the controller determines presence of an object in the middle-distance detection mode (step S12), and when an object is present (step S12: Y), the controller performs control of decreasing the selective number of the drive electrode patterns from the detection drive line Lb to the detection drive line Lc. Thus, the middle-distance detection mode is shifted to the short-distance detection mode. When an object is not present (step S12: N), the controller performs control of increasing the selective number of the drive electrode patterns from the detection drive line Lb to the detection drive line La so that the detection mode is returned to the long-distance detection mode (step S11).

Next, the controller determines presence of an object in the short-distance detection mode (step S13), and when an object is present (step S13: Y), the controller performs control of decreasing the selective number of the drive electrode patterns from the detection drive line Lc to the detection drive line Ld. Thus, the short-distance detection mode is shifted to the position detection mode. When an object is not present (step S13: N), the controller performs control of increasing the selective number of the drive electrode patterns from the detection drive line Lc to the detection drive line Lb so that the detection mode is returned to the middle-distance detection mode (step S12).

Finally, in the position detection mode, the controller determines presence of an object (step S14), and when an object is present (step S14: Y), the controller extracts position coordinates of the object (step S15), and detection is finished. When an object is not present (step S14: N), the controller performs control of increasing the selective number of the drive electrode patterns from the detection drive line Ld to the detection drive line Lc so that the detection mode is returned to the short-distance detection mode (step S13).

When a detection result Dout (detection result on presence or absence of an object) is outputted to the controller 5 in each detection mode, the controller 5 outputs the control signal CTL3 to the timing controller 9 based on the detection result Dout so that line-sequential drive operation using one of the detection drive lines La to Ld is performed. The timing controller 9 line-sequentially drives the common electrode 43 according to the control signal CTL3. In this way, while presence of an object is detected with, for example, the long-distance detection mode as an initial state, the selective number of the drive electrode patterns is gradually increased or decreased so that a detection mode is shifted between the detection modes.

As hereinbefore, in the embodiment, a measure to change a range of an electric line of force is performed in such a manner that when the common electrode 43 is line-sequentially driven, a bundle of a selective number of the drive electrode patterns is set as a unit drive line (each of the detection drive lines La to Ld), and the selective number of the drive electrode patterns is changed. Thus, presence of an object may be detected up to a point at a distance in accordance with the selective number of the drive electrode patterns. Consequently, presence of an object may be detected not only in the case that the object contacts or approaches the display device 1A, but also in the case that the object is in a place distant from the display device.

For example, when the selective number of the drive electrode patterns is set to be the total number or a number close to the total number in line-sequential drive of the common electrode 43, presence of an object at a long distance may be detected (long-distance detection mode). Conversely, when the selective number of the drive electrode patterns is set to be one or a number close to one, since a disposed area of an object may be specified as coordinates in a matrix, accurate position detection may be performed (position detection mode). Consequently, both of long-distance detection of an object and accurate position detection may be achieved.

Particularly, when the selective number of the drive electrode patterns of the detection drive line is gradually decreased from the long-distance detection mode to the position detection mode in accordance with the detection result Dout, gradual detection of an object may be performed in such a manner that while presence of an object is confirmed (while a detectable distance is kept) with the long-distance detection mode as an initial state, position resolution is gradually improved. That is, appropriate detection may be performed depending on a distance of an object, which expands application of the display device. For example, information may be inputted without touching a display screen, or a disposed area of an object approaching the display screen from a long distance may be gradually narrowed.

Moreover, in the embodiment, the common electrode 43 originally provided in a liquid crystal display element is commonly used as one of a pair of touch sensor electrodes including the drive electrode and the detection electrode. In addition, the common drive signal Vcom as a display drive signal is commonly used as a touch sensor drive signal. Thus, it is enough that only the sensor detection electrode 44 is provided as an additionally provided electrode in a capacitance-type touch sensor, and besides a touch sensor drive signal need not be newly prepared. Consequently, a device configuration is simplified.

Second Embodiment

Characteristic Configuration of Second Embodiment

FIGS. 13A to 13D schematically show a layout of effective electrode patterns and non-effective electrode patterns of a sensor detection electrode 44 according to a second embodiment of the invention. In the above embodiment, the selective number of the drive electrode patterns of the common electrode 43 is changed as a specific measure to change a range of an electric line of force. In the second embodiment, a selective number of detection electrode patterns of the sensor detection electrode 44 are effectively operated, and the selective number is changed. The embodiment, which is applied to a capacitance-type touch sensor similar to the display device 1A of the first embodiment, is described with, as an example, a case where gradual detection is performed from a long-distance detection mode to a position detection mode. Hereinafter, the same components as in the display device 1A of the first embodiment are marked with the same reference numerals or signs, and description of them is appropriately omitted.

The sensor detection electrode 44 includes a plurality of stripe detection electrode patterns extending in a direction perpendicular to an extending direction of the drive electrode patterns of the common electrode 43. A detection signal Vdet is outputted from each detection electrode pattern, and inputted to a detection circuit 8.

However, in the embodiment, each detection electrode pattern has a switch for changing between an on state (effective state of a detection function) and an off state (non-effective state of a detection function) for each detection electrode pattern. Here, the off state indicates a floating state or a high-impedance state. Such a switch is used to thin the detection electrode patterns of the sensor detection electrode 44 so that only one or at least two selective detection electrode patterns are effectively operated. In addition, a selective number of the detection electrode patterns to be effectively operated (hereinafter, called effective electrode patterns) is changed so as to be different in each of the detection modes.

A controller 5 outputs a control signal CTL3 to a timing controller 9 based on a detection result Dout outputted from the detection circuit 8 as described in the first embodiment. However, in the embodiment, when the detection result Dout outputted from the detection circuit 8 shows presence of an object, the controller performs control of increasing the selective number of the effective electrode patterns of the sensor detection electrode 44. Such control operation is continuously performed, thereby the described detection modes (the long-distance detection mode to the position detection mode) are gradually exhibited.

Operation and Effects of Second Embodiment

In the embodiment, while display is performed by the same operation as in the display device 1A of the first embodiment, a detection signal is supplied from the sensor detection electrode 44 to the detection circuit 8 along with scanning the common electrode 43 with a common drive signal Vcom, and thus the detection result Dout is outputted.

Detection Operation in the Embodiment

However, in the embodiment, among all electrode patterns of the sensor detection electrode 44, a selective number of effective electrode patterns is changed in each detection mode. Specifically, in the long-distance detection mode, one detection electrode pattern or a number close to one of the detection electrode patterns (here, two patterns disposed on outermost sides) of all the detection electrode patterns of the sensor detection electrode 44 are selected as effective electrode patterns 44A as shown in FIG. 13A. In contrast, in the position detection mode, the total number or a number close to the total number of the detection electrode patterns of the sensor detection electrode 44 are selected as the effective electrode patterns 44A as shown in FIG. 13D. In the middle-distance detection mode, a larger number of the detection electrode patterns than that in the long-distance detection mode, for example, less than half (here, about one third of) the drive electrode patterns are selected as the effective electrode patterns 44A as shown in FIG. 13B. In the short-distance detection mode, at least about half the electrode patterns are selected as the effective electrode patterns 44A. The effective electrode patterns 44A are desirably arranged at equal intervals in each detection mode. In other words, the number of non-effective electrode patterns 44B between the effective electrode patterns 44A is desirably constant in each detection mode.

Here, operation caused by such a difference in selective number of the effective electrode patterns 44A is described with reference to FIGS. 14A and 14B. FIGS. 14A and 14B show a sectional structure of the display device 1A in a simplified manner. However, the long-distance detection mode having the smallest selective-number of the effective electrode patterns 44A (FIG. 14A), and the position detection mode having the largest selective-number of the effective electrode patterns (FIG. 14B) are shown as an example herein. In each figure, while a locus of an electric line of force (A3 or A4) is shown by a dotted line, the locus does not strictly express an actual electric line of force, but schematically expresses the electric line of force for illustrating a range of the electric line.

For example, in the long-distance detection mode, as shown in FIG. 14A, since the selective number of the effective electrode patterns 44A is small, in other words, since most of detection electrode patterns of the sensor detection electrode are narrowed, formation of parasitic capacitance between the detection electrode patterns is suppressed, and consequently a range of the electric line of force (A3) spreads to a long distance. As a result, the electric line of force A3 extends to a point at a distance D1 from a top of the display device 1A. Therefore, when an object is present in one of points from the top of the display device 1A to the point at a distance D1 from the top, a determination result that an object is present is outputted as the detection result Dout. However, in the long-distance detection mode, since most of detection electrode patterns of the sensor detection electrode 44 are thinned, a disposed area of the object is hardly specified in detail.

On the other hand, in the position detection mode, as shown in FIG. 14B, since the selective number of the effective electrode patterns 44A is large, a range of the electric line of force (A4) extends only to a point at a distance D2 (D2<<D1) from the top of the display device 1A along with formation of parasitic capacitance between the detection electrode patterns. Therefore, as in the first embodiment, while presence of an object may be determined in a region near the top of the display device 1A, the object is hardly detected in a place distant from the display device 1A unlike in the long-distance detection mode. In contrast, in the position detection mode, since the selective number of the effective electrode patterns 44A is set to approximately the total number, a disposed area (position coordinates) of an object may be detected in detail.

Similarly, in the middle-distance detection mode and the short-distance detection mode, an object may be detected up to a point at a distance in accordance with a selective number of the effective electrode patterns 44A. In this way, a range of an electric line of force is changed depending on a selective number of the effective electrode patterns 44A. Specifically, as the selective number of the effective electrode patterns 44A is smaller, the range of the electric line of force is expanded, and thus a detectable distance is increased. In contrast, as the selective number of the effective electrode patterns 44A is larger, the range of the electric line of force is reduced, and thus the detectable distance is decreased. On the other hand, position resolution becomes higher with decrease in selective number of the effective electrode patterns 44A, and becomes lower with increase in selective number of the patterns.

Therefore, as in the first embodiment, in the long-distance detection mode, presence of an object at a long distance is determined, and in the middle-distance detection mode, presence of an object at a middle distance is determined, and when an object is present, a disposed area of the object is approximately specified. In the short-distance detection mode, presence of an object at a short distance is determined, and when an object is present, a disposed area of the object is specified. In the position detection mode, presence of an object contacting or approaching the display device is determined, and when an object is present, a disposed area of the object is acquired as position coordinates in an XY matrix.

The controller 5 gradually changes the selective number of the effective electrode patterns 44A in accordance with the detection result Dout outputted from the detection circuit 8 so that each of the detection modes is gradually exhibited. However, in the embodiment, when an object is present in the long-distance detection mode, the selective number of the effective electrode patterns 44A is increased so that the detection mode is shifted to the middle-distance detection mode, and when an object is not present, the selective number of the effective electrode patterns 44A is kept so that the long-distance detection mode is continued. In the middle-distance detection mode, when an object is present, the selective number of the effective electrode patterns 44A is increased so that the detection mode is shifted to the short-distance detection mode, and when an object is not present, the selective number of the effective electrode patterns 44A is decreased so that the detection mode is returned to the long-distance detection mode. Similarly, in the short-distance detection mode, the detection mode is shifted to the position detection mode, or returned to the middle-distance detection mode depending on presence or absence of an object. When an object is present in the position detection mode, position coordinates of the object is extracted, and detection is finished. When an object is not present in the mode, the selective number of the effective electrode patterns 44A is increased so that the detection mode is returned to the short-distance detection mode.

When a detection result Dout (detection result on presence or absence of an object) is outputted to the controller 5 in each detection mode, the controller 5 outputs a control signal CTL3 to the timing controller 9 based on the detection result Dout so that detection operation using the effective electrode patterns 44A is performed. The timing controller 9 selects the effective electrode patterns 44A of the sensor detection electrode 44 according to the control signal CTL3. In this way, while presence of an object is detected with the long-distance detection mode as an initial state, the selective number of the effective electrode patterns 44A is gradually increased or decreased so that a detection mode is shifted between the detection modes.

As hereinbefore, in the embodiment, since the selective number of the effective electrode patterns 44A of the sensor detection electrode is changed as a measure to change a range of an electric line of force, presence of an object may be detected up to a point at a distance in accordance with the selective number of the effective electrode patterns 44A. Consequently, the same advantage as in the first embodiment may be obtained.

For example, when the selective number of the effective electrode patterns 44A of the sensor detection electrode 44 is set to be one or a number close to one, presence of an object at a long distance may be detected (long-distance detection mode). Conversely, when the selective number of the effective electrode patterns 44A is set to be the total number or a number close to the total number, since a disposed area of an object may be specified as coordinates in a matrix, accurate position detection may be performed (position detection mode). Consequently, both of long-distance detection of an object and accurate position detection may be achieved as in the first embodiment.

Particularly, when the selective number of the effective electrode patterns 44A is gradually increased from the long-distance detection mode to the position detection mode in accordance with the detection result Dout, gradual detection of an object may be performed in such a manner that while a detectable distance is kept with the long-distance detection mode as an initial state, position resolution is gradually improved. Consequently, appropriate detection may be performed depending on a distance of an object, which expands application of the display device as in the first embodiment.

In the first and second embodiments, while a method of changing the selective number of the drive electrode patterns in line-sequential drive of the common electrode 43, and a method of changing the selective number of the effective electrode patterns 44A of the sensor detection electrode 44 are given as examples of a measure to change a range of an electric line of force respectively, the methods may be combined. That is, in the long-distance detection mode, the selective number of the drive electrode patterns in line-sequential drive of the common electrode 43 is set to the total number or a number close to the total number, and the selective number of the effective electrode patterns 44A of the sensor detection electrode 44 is set to one or a number close to one. In contrast, in the position detection mode, it is enough that the selective number of the drive electrode patterns in line-sequential drive of the common electrode 43 is set to one or a number close to one, and the selective number of the effective electrode patterns 44A of the sensor detection electrode 44 is set to the total number or a number close to the total number.

Third Embodiment

FIGS. 15A to 15D schematically show inverted waveforms (AC square waves Sg) of a detection drive signal (Vcom2) according to a third embodiment of the invention in each of the detection modes. In the above embodiment, the selective number of the drive electrode patterns in line-sequential drive of the common electrode 43 is changed, or the selective number of the effective electrode patterns of the sensor detection electrode 44 is changed as a measure to change a range of an electric line of force. In the third embodiment, a drive signal Vcom2, which is applied to each drive electrode pattern in line-sequential drive of the common electrode 43, is changed. The embodiment, which is applied to a capacitance-type touch sensor similar to the display device 1A of the first embodiment, is described with, as an example, a case where gradual detection is performed from a long-distance detection mode to a position detection mode. Hereinafter, the same components as in the display device 1A of the first embodiment are marked with the same reference numerals or signs, and description of them is appropriately omitted.

In the embodiment, while display is performed by the same operation as in the display device 1A of the first embodiment, a detection signal is supplied from a sensor detection electrode 44 to a detection circuit 8 along with scanning a common electrode 43 with a common drive signal Vcom, and thus a detection result Dout is outputted.

However, in the embodiment, the detection drive signal Vcom2 is used separately from a display common-drive signal (Vcom1) as a drive signal applied to each drive electrode pattern, and the drive signal Vcom2 is changed in each of detection modes in line-sequential drive of the common electrode 43. Specifically, the drive signal Vcom2 is changed such that an absolute value of the drive signal Vcom2 is gradually reduced from the long-distance detection mode to the position detection mode as shown in FIGS. 15A to 15D (Va>Vb>Vc>Vd).

The controller 5 gradually changes the drive signal Vcom2 in accordance with the detection result Dout outputted from the detection circuit 8 so that each detection mode is gradually exhibited. Specifically, in the long-distance detection mode, when an object is present, an absolute value of the drive signal Vcom2 (amplitude of a square wave) is decreased so that the detection mode is shifted to a middle-distance detection mode, and when an object is not present, a current drive signal Vcom2 is kept so that the long-distance detection mode is continued. Next, in the middle-distance detection mode, when an object is present, an absolute value of the drive signal Vcom2 is decreased so that the detection mode is shifted to the short-distance detection mode, and when an object is not present, an absolute value of the drive signal Vcom2 is increased so that the detection mode is returned to the long-distance detection mode. Similarly, in the subsequent short-distance detection mode, the detection mode is shifted to the position detection mode, or returned to the middle-distance detection mode depending on presence or absence of an object. When an object is present in the position detection mode, position coordinates of the object is extracted, and detection is finished. When an object is not present in the position detection mode, an absolute value of the drive signal Vcom2 is increased so that the detection mode is returned to the short-distance detection mode.

When the detection result Dout (detection result on presence or absence of an object) is outputted to the controller 5 in each detection mode, the controller 5 outputs a control signal CTL3 to a timing controller 9 so that detection operation using the drive signal Vcom2 is performed based on the detection result Dout. The timing controller 9 performs line-sequential drive using the drive signal Vcom2 according to the control signal CTL3. In this way, while presence of an object is detected with the long-distance detection mode as an initial state, the absolute value of the drive signal Vcom2 is gradually increased or decreased, so that a detection mode is shifted between the detection modes.

As hereinbefore, in the embodiment, since the absolute value of the drive signal Vcom2 is changed as a measure to change a range of an electric line of force, presence of an object may be detected up to a distance in accordance with size of the drive signal Vcom2. Consequently, the same advantage as in the first embodiment may be obtained.

As a measure to change a range of an electric line of force, control of changing the drive signal Vcom2 in the third embodiment may be combined with control of changing the selective number of the drive electrode patterns in line-sequential drive of the common electrode 43 (first embodiment). That is, in the long-distance detection mode, the selective number of the drive electrode patterns is set to the total number or a number close to the total number, and besides a drive signal Va is used as a drive signal Vcom2 applied to the selected drive electrode pattern. In contrast, in the position detection mode, it is enough that the selective number of the drive electrode patterns is set to one or a number close to one, and a drive signal Vd is used as a drive signal Vcom2 applied to the selected drive electrode pattern.

The control of changing the drive signal Vcom2 in the third embodiment may be combined with the control of changing the selective number of the effective electrode patterns of the sensor detection electrode 44 in the second embodiment. Alternatively, all the methods in the first to third embodiments may be combined.

Fourth Embodiment

Figure 16:
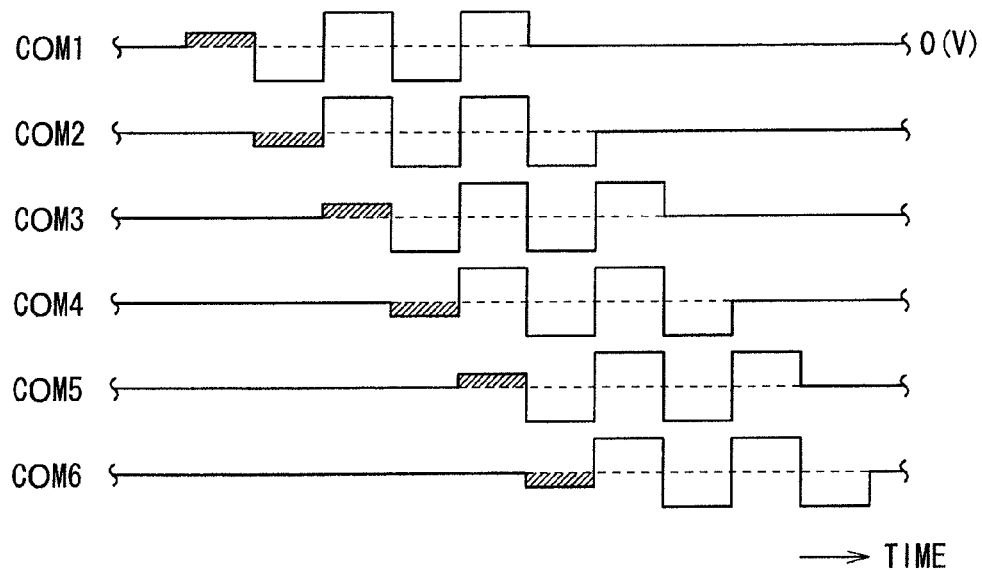
FIG. 16 is a timing chart schematically showing application timing of each of a detection drive signal and a display common-drive signal according to a fourth embodiment of the invention.

FIG. 16 schematically shows application timing of each of a drive signal Vcom2 and a common drive signal Vcom1 according to a fourth embodiment of the invention. The first to third embodiments have been described with a case, as an example, where the common electrode 43 for display is commonly used as the drive electrode for detection. In such a case, for details, the common electrode 43 is applied with both the display common-drive signal Vcom1 and the detection drive signal Vcom2. In the fourth embodiment, description is made on preferable application operation of the drive signal Vcom1 or Vcom2 (modulation operation of the drive signal Vcom) in the case that the drive signals Vcom1 and Vcom2 are different from each other. The case, where the drive signals Vcom1 and Vcom2 are different from each other, includes, for example, a case where the drive signal Vcom2 is made larger than the drive signal Vcom1 (Vcom2>Vcom1) in order to improve detection sensitivity, or a case where an absolute value of the drive signal Vcom2 is modulated for transition between modes (third embodiment). The same components as in the display device 1A of the first embodiment are marked with the same reference numerals or signs, and description of them is appropriately omitted. Here, description is made on a case, as an example, where an absolute value of the drive signal Vcom2 is larger than an absolute value of the drive signal Vcom1.

Specifically, the timing controller 9 applies the drive signal Vcom2 to each of drive electrode patterns of the common electrode 43 at the following timing. That is, the timing controller performs control such that each drive electrode pattern is line-sequentially applied with the display drive signal Vcom1, and application timing of the drive signal Vcom1 is different from application timing of the detection drive signal Vcom2. In other words, the timing controller 9 applies the drive signal Vcom2 to a drive electrode pattern being not applied with the drive signal Vcom1 among the drive electrode patterns. For example, as shown in FIG. 16, the drive signal Vcom1 (shadowed portion) is applied to each of the drive electrode patterns (here, six drive electrode patterns COM1 to COM6 as an example), and then the drive signal Vcom2 is sequentially applied. In other words, the drive signal Vcom1 is applied, then an absolute value of the drive signal Vcom1 is increased (amplitude is expanded) so that the signal Vcom1 is modulated into the drive signal Vcom2.

Figure 17:
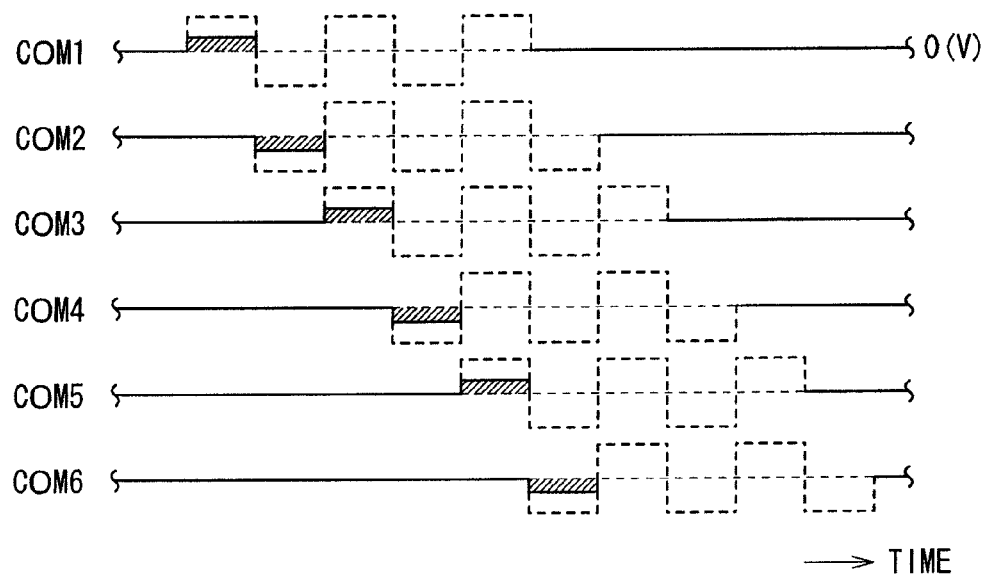
FIG. 17 is a timing chart according to a comparative example of the embodiment shown in FIG. 16.

As hereinbefore, when the common electrode 43 for display is commonly used as a drive electrode for detection, application timing of the drive signal Vcom2 is desirably different from application timing of the drive signal Vcom1. If application timing of the drive signal Vcom1 (write timing of a video signal) is synchronized with application timing of the drive signal Vcom2 (for example, a case of FIG. 17), potential difference between the pixel electrode 22 and the common electrode 43 is changed, so that desired display (display with proper luminance level based on a video signal Vsig) is hardly obtained. Therefore, the drive signals Vcom1 and Vcom2 are applied at different timing as in the embodiment, thereby even if the common electrode 43 for display is commonly used as the drive electrode for detection, desired display is easily achieved. In FIG. 17, the drive signal Vcom2 is shown by a broken line against the drive signal Vcom1 applied in a line-sequential manner.

The above merit particularly becomes large in the case that difference between the drive signals Vcom1 and Vcom2 is large, for example, in the case that the drive signal Vcom2 is made larger to improve detection sensitivity, or in the case of the long-distance detection mode in the third embodiment. This is because when a drive signal Vcom2 having a large difference from the drive signals Vcom1 is applied in video writing, display tends to be affected thereby.

Fifth Embodiment

Figure 18:
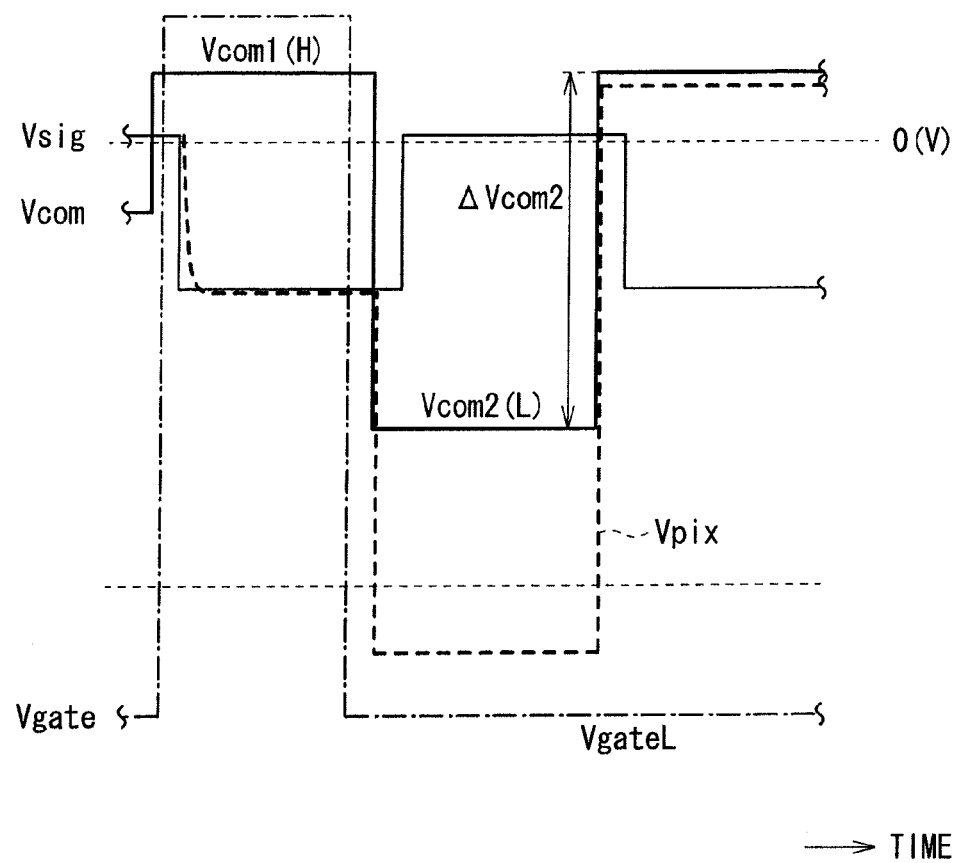
FIG. 18 is a timing chart of each of a drive signal, a video signal, and gate potential of TFT according to a fifth embodiment of the invention.

FIG. 18 shows a timing chart of a drive signal Vcom (Vcom1 or Vcom2), a video signal Vsig, and gate potential Vgate of TFT (TFT element Tr shown in FIG. 6) according to a fifth embodiment of the invention. In the fourth embodiment, description has been made on operation that when the common electrode 43 for display is commonly used as the drive electrode for detection, drive signals Vcom1 and Vcom2 are applied to the common electrode 43 at timing different from each other. In the fifth embodiment, further preferable operation is described. The same components as in the display device 1A of the first embodiment are marked with the same reference numerals or signs, and description of them is appropriately omitted.

Specifically, when the gate potential Vgate is on potential (TFT is on), a timing controller 9 applies the drive signal Vcom1 to the common electrode 43, and applies the video signal Vsig to the pixel electrode 22 respectively, thereby pixel potential Vpix (potential of the liquid crystal element LC shown in FIG. 6) is displaced so that a video picture is written. In the embodiment, gate potential (VgateL) in an off state of each TFT is set to satisfy the following formula (1). In the formula, VsigL represents low potential of the video signal Vsig, ΔVcom2 represents displacement (twice as large as amplitude) from the minimum potential to the maximum potential of the drive signal Vcom2, and Vth represents a threshold voltage of TFT. ΔVcom2 is set according to the following formula (2). More desirably, VgateL is set to satisfy the following formula (3) in consideration of Vgate (plunge). Vgate (plunge) represents plunge potential caused by parasitic capacitance between the gate line 26 and a pixel (potential of the liquid crystal element LC shown in FIG. 6).

$$VgateL \leq VsigL - \Delta Vcom2 + Vth \quad (1)$$

$$\Delta Vcom2 = Vcom1_H - Vcom2_L \quad (2)$$

$$VgateL \leq VsigL - \Delta Vcom2 + Vth - Vgate(plunge) \quad (3)$$

Figure 19A:
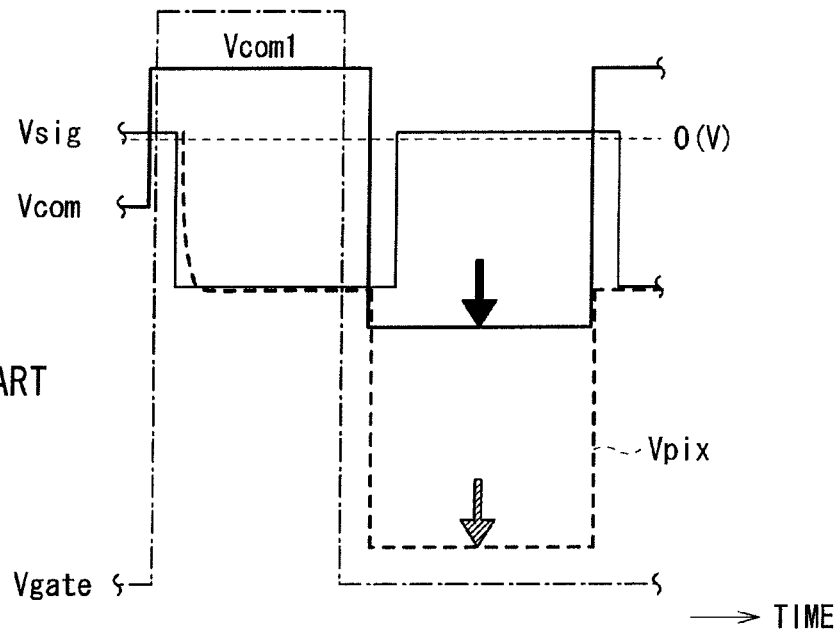
FIGS. 19A and 19B are diagrams for illustrating behavior of each of a drive signal Vcom and pixel potential Vpix immediately after writing of a video signal according to a comparative example.
Figure 19B:
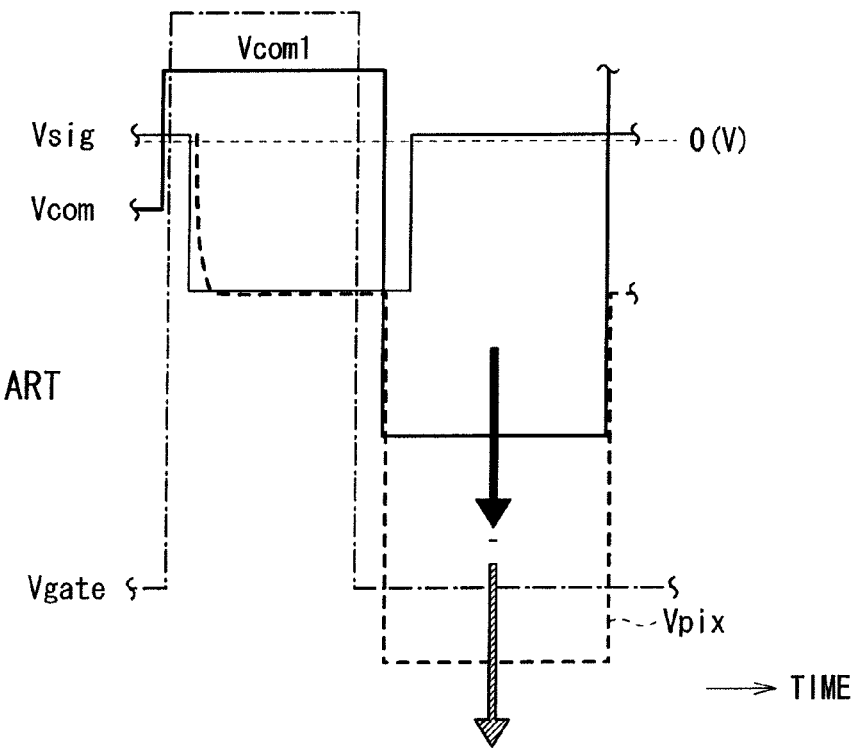

Here, a comparative example of the embodiment is described with reference to FIGS. 19A and 19B. FIGS. 19A and 19B show behavior of each of the drive signal Vcom and the pixel potential Vpix immediately after a video signal is written, namely, in the case that the gate potential Vgate transitions from on potential to off potential. As shown in FIG. 19A, immediately after a video signal is written, the gate potential is decreased to the off potential, and the drive signal Vcom is reduced in conjunction with this (black arrow), therefore the pixel potential Vpix is accordingly reduced (shaded arrow). Therefore, in such a state immediately after a video signal is written, when the drive signal Vcom is modulated such that amplitude of the signal is increased as shown in FIG. 19B, the pixel potential Vpix extremely drops, which may result in a phenomenon that the pixel potential is lower than the gate potential. When the pixel potential Vpix becomes lower than the gate potential (off potential), since each pixel is applied with a reverse bias voltage, desired video display is hardly performed.

Thus, as in the embodiment, the gate potential satisfies the formula (2) (desirably formula (3)) depending on the drive signal Vcom, thereby even if the drive signal Vcom is applied immediately after a video signal is written, the pixel potential Vpix may be substantially prevented from falling below the gate potential VgateL. Consequently, while the drive signal Vcom is modulated, influence on display due to drop of pixel potential Vpix may be suppressed, leading to desired video display.

Sixth Embodiment

Figure 20:
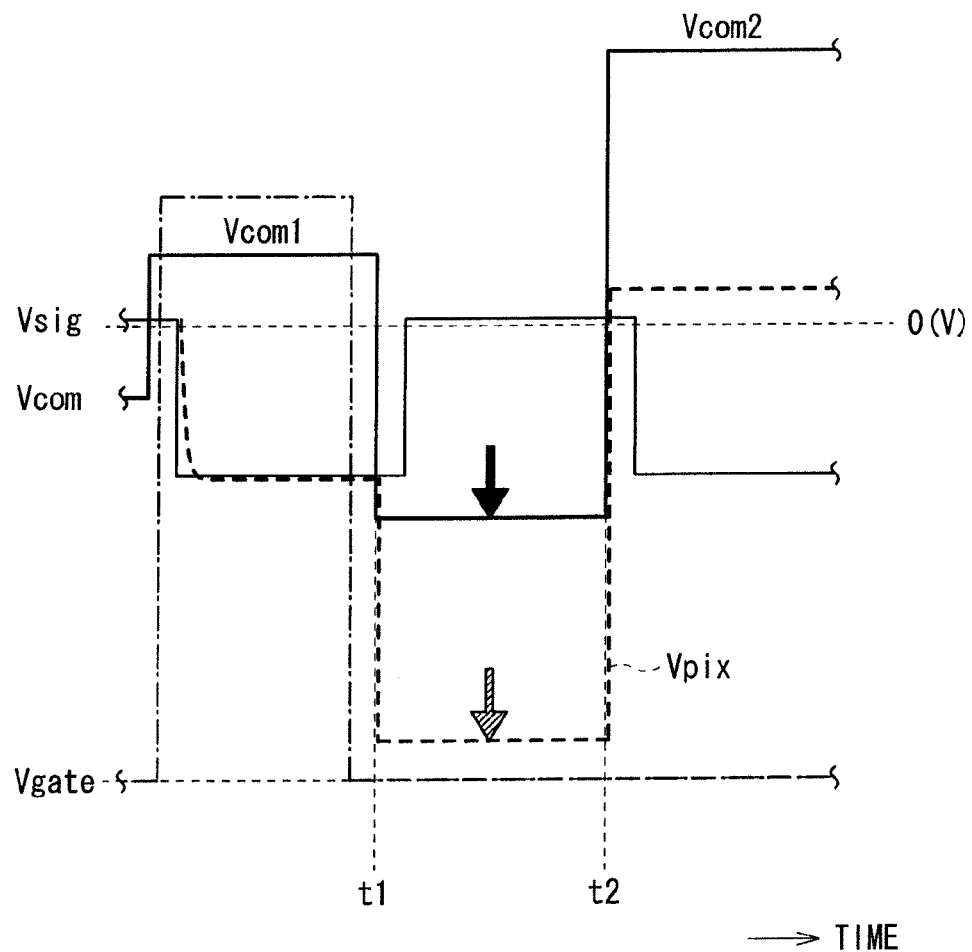
FIG. 20 is a timing chart of each of a drive signal, a video signal, and gate potential of TFT according to a sixth embodiment of the invention.

FIG. 20 shows a timing chart of a drive signal Vcom (Vcom1 or Vcom2), a video signal Vsig, and gate potential Vgate of TFT according to a sixth embodiment of the invention. In the fifth embodiment, when the drive signals Vcom1 and Vcom2 are applied at different timing, the gate potential VgateL is set to satisfy a predetermined formula, thereby influence on display due to drop of pixel potential Vpix is suppressed. In the sixth embodiment, another method for suppressing such influence on display is described. The same components as in the display device 1A of the first embodiment are marked with the same reference numerals or signs, and description of them is appropriately omitted.

Specifically, when the gate potential Vgate is on potential (TFT is on), a timing controller 9 applies the drive signal Vcom1 to the common electrode 43, and applies the video signal Vsig to the pixel electrode 22 respectively, thereby a video picture is written.

However, in the embodiment, application of the drive signal Vcom2 (modulation control from the drive signal Vcom1 to the drive signal Vcom2) is performed after a lapse of a certain period of time from application of the drive signal Vcom1 rather than immediately after the application of the drive signal Vcom1 unlike in the fifth embodiment. For example, as shown in FIG. 20, the drive signal Vcom2 is not applied (modulation control from the drive signal Vcom1 to the drive signal Vcom2 is not performed) from an application finish point (t1) of the drive signal Vcom1 to a point (t2) after a lapse of a half cycle of a square wave of the drive signal Vcom. Control of applying the drive signal Vcom2 is performed (modulation control from the drive signal Vcom1 to the drive signal Vcom2 is performed) at the point t2. Even in the embodiment, the formulas (1) to (3) in the fifth embodiment may be satisfied.

In this way, application of the drive signal Vcom2 is performed after a lapse of a certain period of time from application of the drive signal Vcom1, thereby the following advantage is given. That is, while the pixel potential Vpix temporarily drops through transition of the gate potential Vgate to off potential immediately after a video signal is written as described above, such drop of the pixel potential Vpix is not so great that the potential becomes lower than the off potential, and therefore display is less affected thereby. After that, when amplitude of the drive signal Vcom is expanded so as to apply the drive signal Vcom2, the pixel potential Vpix is accordingly raised. Consequently, while influence on display due to drop of pixel potential Vpix is suppressed, the drive signal Vcom may be modulated as in the fifth embodiment.

In the fourth to sixth embodiments, preferable drive operation has been described with several examples in the case that the display drive signal Vcom1 and the detection drive signal Vcom2 applied to the common electrode 43 are different from each other. However, this is not limitative, and the following drive method may be used. That is, as shown in FIG. 17, when the drive signal Vcom2 is further applied to a pixel as a writing object of the drive signal Vcom1, pixel potential is changed as described before, and, for example, a level of the video signal Vsig itself may be modulated in anticipation of such change in pixel potential. Even by such a method, desired display may be obtained. However, in the case that the level of the video signal Vsig is modulated, since IC drive tends to be applied with a load, the method described in each of the fourth to sixth embodiments is practical.

Figure 21:
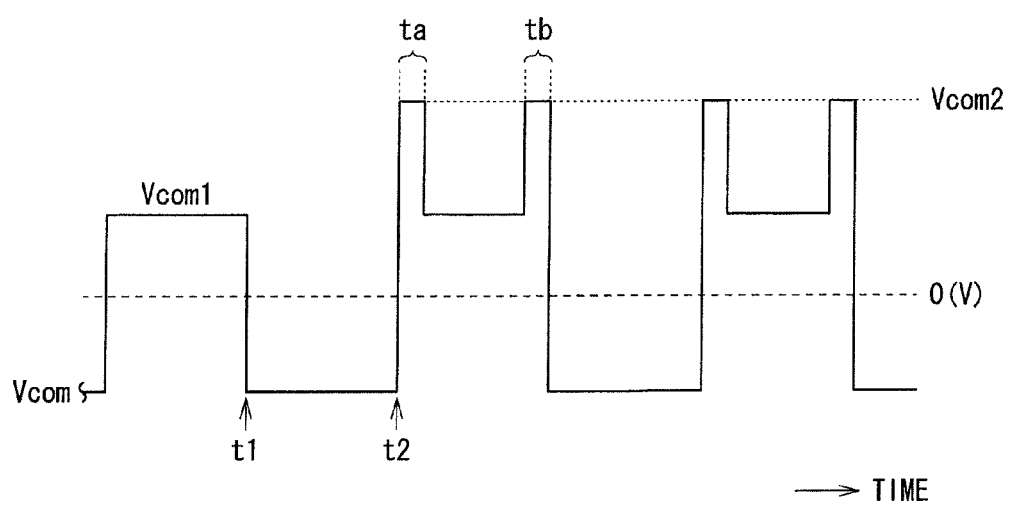
FIG. 21 is a timing chart showing another example of the drive signal shown in FIG. 20.

The drive signal Vcom2 may be applied only in a particular period. Specifically, as shown in FIG. 21, amplitude of the signal is expanded (modulation from the drive signal Vcom1 to the drive signal Vcom2) only in a period ta or tb (here, each period immediately before or after a moment at which polarity of Vcom is changed) during which object detection is performed. Since such drive operation reduces DC voltage application time to liquid crystal, occurrence of seizure and the like may be suppressed. Moreover, since the drive signal Vcom2 may be returned to the display drive signal Vcom1 before the video signal Vsig is applied, two different kinds of potential need not be concurrently used, leading to reduction in load of IC or simplification of peripheral circuits.

Description has been made on a case where Vcom2 is made larger than Vcom1 for increasing detection sensitivity as an example of a case where the drive signals Vcom1 and Vcom2 are different from each other. In such a case, change in detection mode may not be involved. Specifically, while Vcom2>Vcom1 may be set on the assumption of change operation of the detection mode described in the first to third embodiments, detection drive may be performed without mode change, namely, may be performed while a drive signal Vcom2 (>Vcom1) having a certain value is continuously used. The value of the drive signal Vcom2 is set larger, thereby detection sensitivity is improved and thus long-distance detection may be performed. The former configuration with mode change operation (change operation of a range of an electric line of force) corresponds to the first display device of an embodiment of the invention, and the latter configuration without mode change operation corresponds to the second display device of the embodiment of the invention.

Next, modifications of the display device of each of the first to sixth embodiments are described. Hereinafter, the same components as in the display device 1A of the first embodiment are marked with the same reference numerals or signs, and description of them is appropriately omitted.

Modification 1

Figure 22:
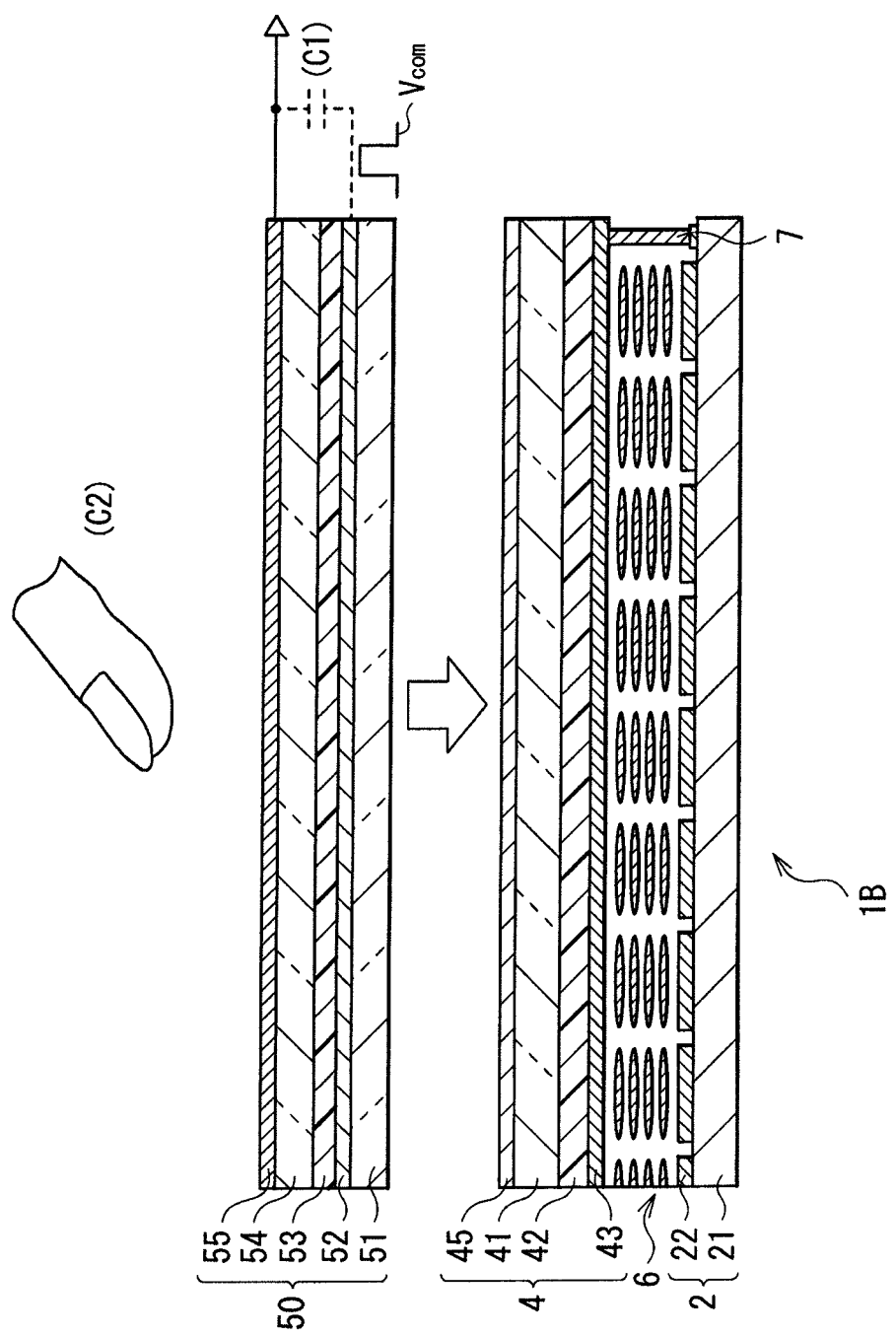
FIG. 22 is a section diagram showing a schematic structure of a display device according to modification 1.

FIG. 22 shows a relevant-part section structure of a display device 1B according to modification 1. The display device 1B includes a liquid crystal display element and a capacitance-type touch sensor like the display device 1A of the first embodiment. However, in the modification, the touch sensor is provided as a touch panel 50 separately from the liquid crystal display element unlike in the first embodiment where the common electrode 43 for display is commonly used so that the touch sensor is integrated with the liquid crystal display element. Specifically, in the display device 1B, the touch panel 50 is disposed and used on a side of a polarizing plate 45 of the liquid crystal display element in which a liquid crystal layer 6 is enclosed between a pixel substrate 2 and a counter substrate 4.

The touch panel 50 has a sensor drive electrode 52, an adhesion layer 53, a transparent substrate 54, and a sensor detection electrode 55 provided in this order on a transparent substrate 51. The sensor drive electrode 52 is divided into a plurality of drive electrode patterns, and each drive electrode pattern is line-sequentially applied with a drive signal Vcom like the common electrode 43 of the first embodiment. Similarly, the sensor detection electrode 55 is divided into a plurality of detection electrode patterns, and each detection electrode pattern extends perpendicularly to an extending direction of each drive electrode pattern of the sensor drive electrode 52 like the sensor detection electrode 44 in the first embodiment.

The touch sensor may be separated from the display element in this way, and each of the methods described in the first to third embodiments may be applied to the display device 1B in the same way as above. However, a device configuration may be more simplified in the display device 1A of the first embodiment where the common electrode 43 is commonly used as the sensor drive electrode.

Modification 2

Figure 23:
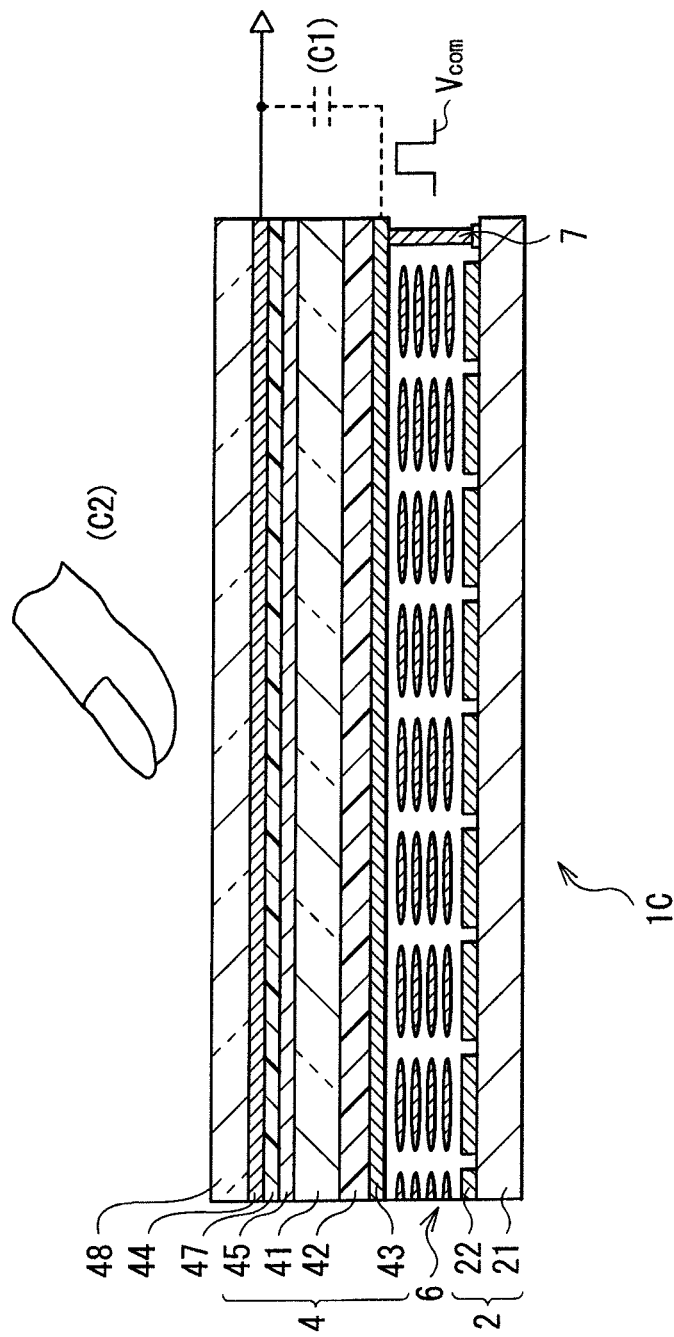
FIG. 23 is a section diagram showing a schematic structure of a display device according to modification 2.

FIG. 23 shows a relevant-part section structure of a display device 1C according to modification 2. The display device 1C includes a liquid crystal display element and a capacitance-type touch sensor like the display device 1A of the first embodiment. However, the display device 1C is different from the display device 1A of the first embodiment in that a sensor detection electrode 44 is disposed on an outer side with respect to a polarizing plate 45. Specifically, the display device 1C has an adhesion layer 47, the sensor detection electrode 44, and a transparent substrate 48 provided in this order on the polarizing plate 45. In this way, the sensor detection electrode 44 need not be necessarily provided on an inner side with respect to the polarizing plate 45, and may be configured to be arranged on a user side.

Modification 3

Configuration of Display Device 1D

Figure 24:
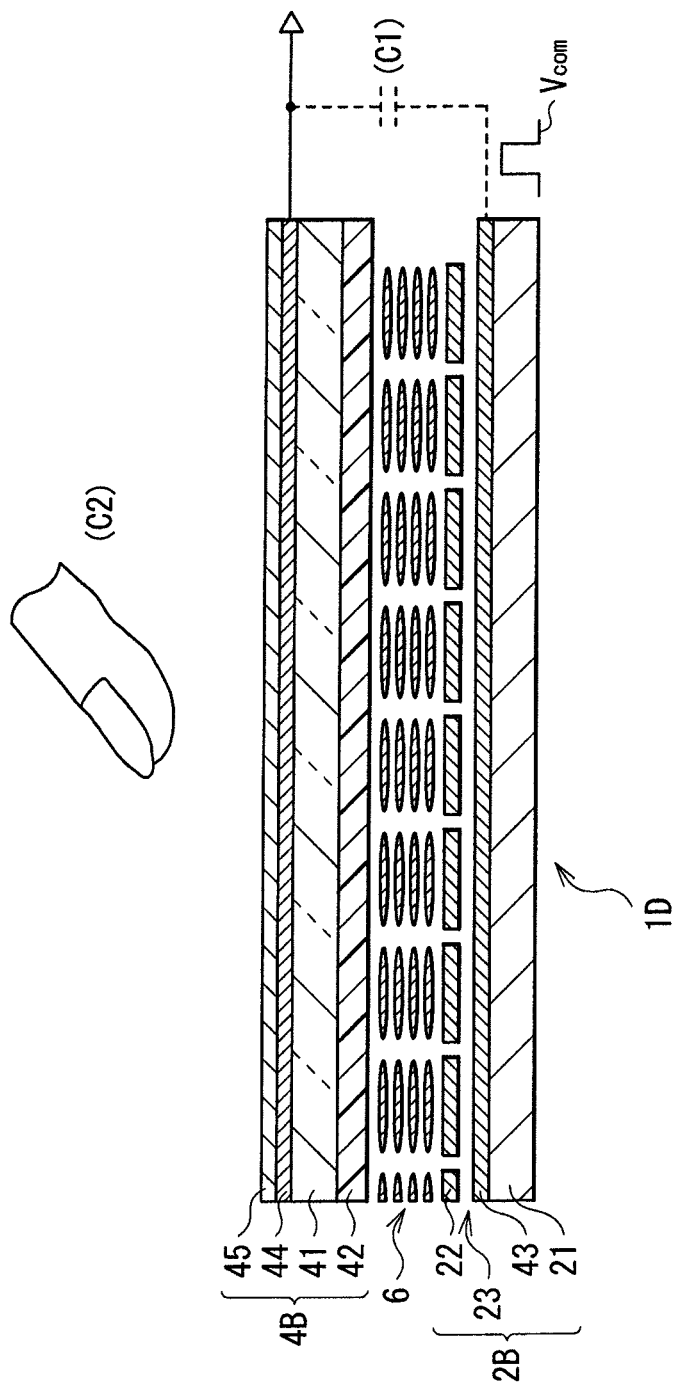
FIG. 24 is a section diagram showing a schematic structure of a display device according to modification 3.
Figure 25B:
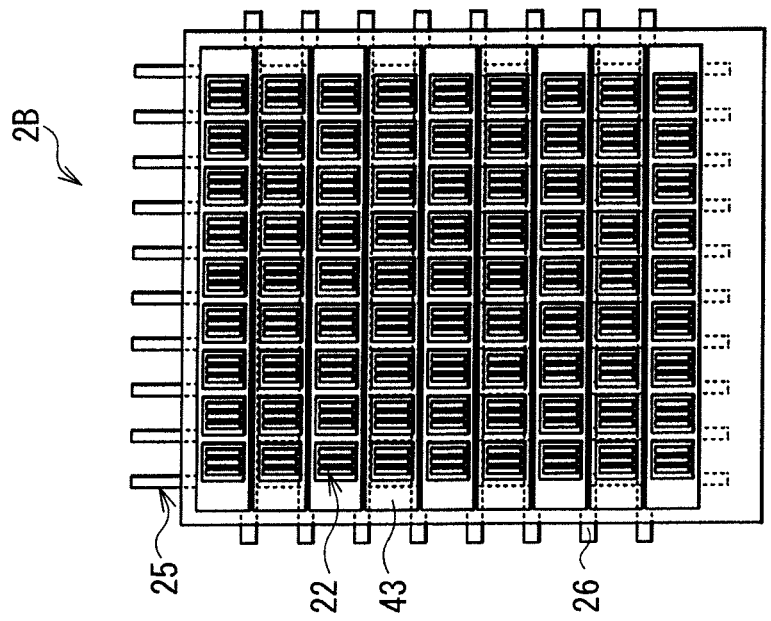
FIGS. 25A and 25B are a section diagram and a plan diagram showing a detailed configuration of part of a pixel substrate of the display device shown in FIG. 23.
Figure 25A:
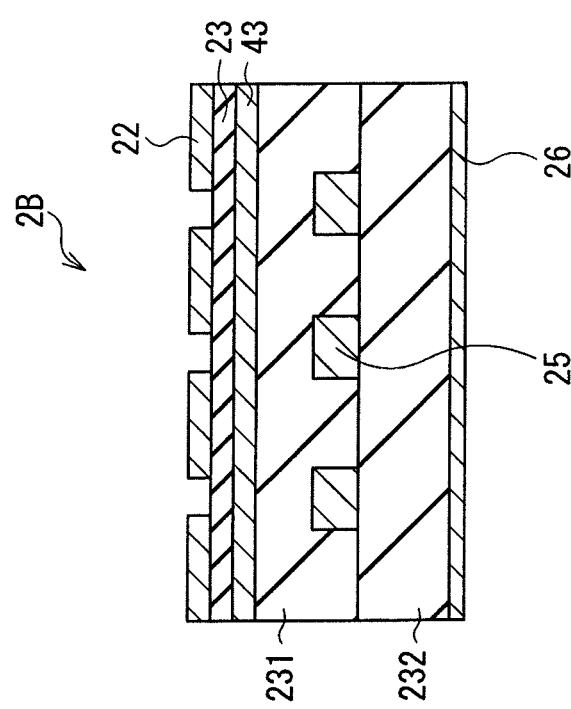
Figure 26B:
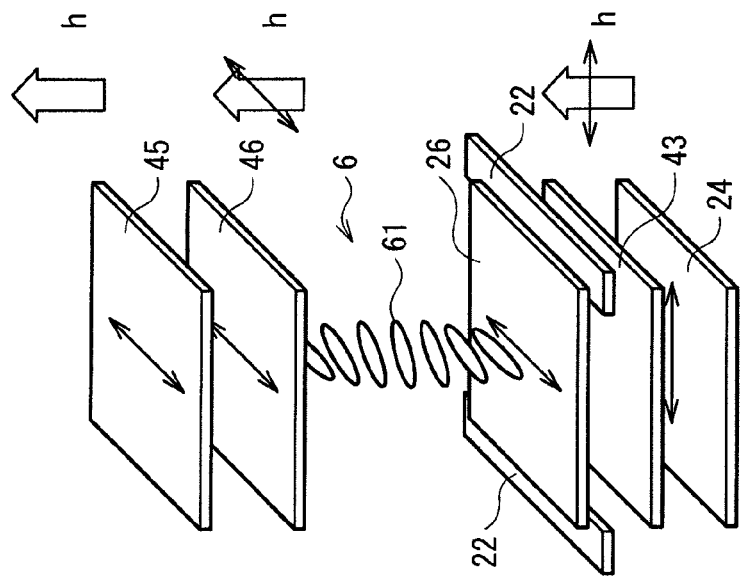
FIGS. 26A and 26B are expanded perspective diagrams of a relevant part of the display device shown in FIG. 23.
Figure 26A:
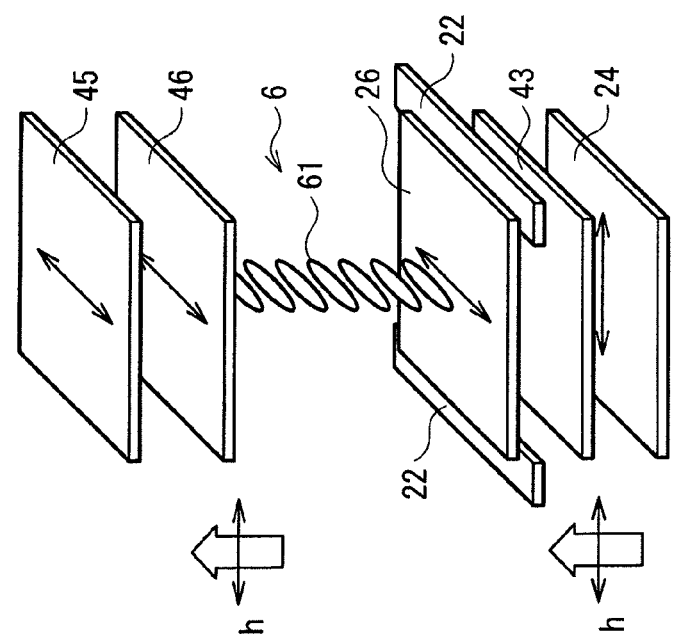

FIG. 24 shows a relevant-part section structure of a display device 1D according to modification 3. FIGS. 25A and 25B show a detailed configuration of a pixel substrate (pixel substrate 2B described later) of the display device 1D. FIGS. 26A and 26B show a perspective structure of the display device 1D. The display device 1D includes a liquid crystal display element and a capacitance-type touch sensor like the display device 1A of the first embodiment. However, the display device 1D is different from the display device 1A of the first embodiment in that a liquid crystal element of a transverse electric mode is used as a display element.

The display device 1D includes a pixel substrate 2B, a counter substrate 4B disposed facing the pixel substrate 2B, and a liquid crystal layer 6 provided between the pixel substrate 2B and the counter substrate 4B.

The pixel substrate 2B has a TFT substrate 21, a common electrode 43 arranged on the TFT substrate 21, and a plurality of pixel electrodes 22 arranged in a matrix pattern on the common electrode 43 via an insulating layer 23. On the TFT substrate 21, a not-shown display driver for driving each pixel electrode 22 and TFT are formed, and besides, lines such as signal lines (source lines) 25 supplying an image signal to each pixel electrode and gate lines 26 driving each TFT are formed (FIGS. 25A and 25B). In addition, a detection circuit 8 performing touch detection operation is formed on the TFT substrate 21. The common electrode 43 is commonly used as a sensor drive electrode as in the first embodiment.

The counter substrate 4B includes a color filter 42 formed on one surface of a glass substrate 41. A sensor detection electrode 44 is formed on the other surface of the glass substrate 41, and furthermore, a polarizing plate 45 is arranged on the sensor detection electrode 44. The sensor detection electrode 44 may be directly formed on the counter substrate 4B by a thin film process, or may be indirectly formed thereon. The common electrode 43 is applied with a common drive signal Vcom having an AC square waveform from the TFT substrate 21. The common drive signal Vcom defines a pixel voltage applied to each pixel electrode 22 and a display voltage of each pixel, and is commonly used as a drive signal of the touch sensor. The common electrode 43 and the sensor detection electrode 44 are divided into a plurality of electrode patterns extending in an intersecting manner with each other as in the first embodiment.

The liquid crystal layer 6 modulates light passing through the layer 6 depending on a state of an electric field, and, for example, liquid crystal of a transverse electric mode, such as a FFS (Fringe Field Switching) mode or an IPS (In-Plane Switching) mode, is used for the layer 6. Here, the FFS mode is described with reference to FIGS. 26A and 26B. In a FFS-mode liquid crystal element, a pixel electrode 22 patterned in a comb-like shape is disposed on the common electrode 43 formed on the display substrate 2B via the insulating layer 23, and an alignment film 26 is formed covering the pixel electrode. The liquid crystal layer 6 is sandwiched between the alignment film 26 and an alignment film 46 on a counter substrate 4B side. The two polarizing plates 24 and 45 are arranged in a crossed nicols state. A rubbing direction of each of the two alignment films 26 and 46 corresponds to a direction of one of transmission axes of the two polarizing plates 24 and 45. Here, the figures show a case where the rubbing direction corresponds to a direction of a transmission axis of the polarizing plate 45. Furthermore, the rubbing direction of each of the two alignment films 26 and 46 and the direction of the transmission axis of the polarizing plate 45 are set approximately parallel to an extending direction of each pixel electrode 22 (longitudinal direction of a comb) within a range where a rotation direction of a liquid crystal molecule is defined.

Operation and Effects of Display Device 1D

Figure 27A:
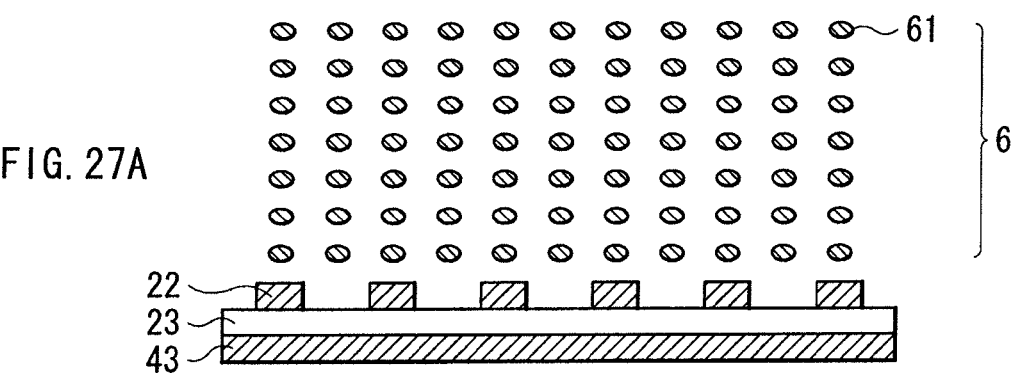
FIGS. 27A and 27B are section diagrams for illustrating operation of the display device shown in FIG. 23.
Figure 27B:
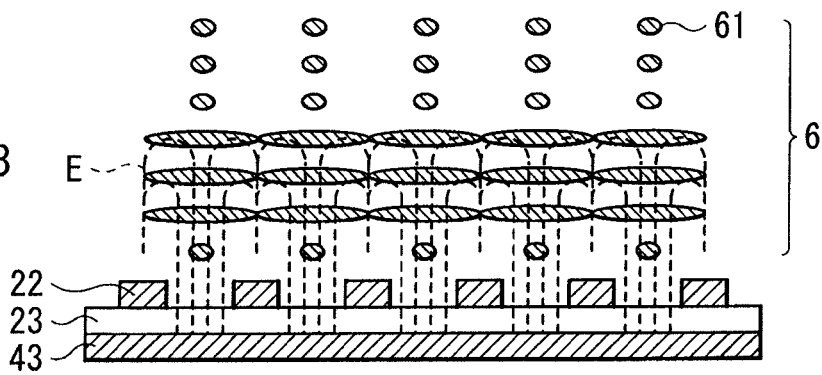

First, a display operation principle of the FFS-mode liquid crystal element is briefly described with reference to FIGS. 26A and 26B and FIGS. 27A and 27B. FIGS. 27A and 27B show a relevant-part section of a liquid crystal element, where FIG. 27A shows a state of the liquid crystal element applied with no electric field, and FIG. 27B shows a state of the liquid crystal element applied with an electric field.

In the state where voltage is not applied between the common electrode 43 and the pixel electrodes 22 (FIGS. 26A and 27A), an axis of each liquid crystal molecule 61 of the liquid crystal layer 6 is perpendicular to a transmission axis of the polarizing plate 24 on an incidence side, and parallel to a transmission axis of the polarizing plate 45 on an output side. Therefore, incidence light h transmitted by the polarizing plate 24 on the incidence side reaches the polarizing plate 45 on the output side without causing phase difference within the liquid crystal layer 6, and is absorbed by the plate 45, leading to black display. In contrast, in the state where voltage is applied between the common electrode 43 and the pixel electrodes 22 (FIGS. 26B and 27B), an alignment direction of each liquid crystal molecule 61 rotates in an oblique direction to an extending direction of each pixel electrode 22 by a transverse electric field E formed between the pixel electrodes. At that time, electric field intensity in white display is optimized such that a liquid crystal molecule 61 located in the center in a thickness direction of the liquid crystal layer 6 rotates about 45 degrees. Thus, while the incidence light h, which has been transmitted by the polarizing plate 24 on the incidence side, passes through the liquid crystal layer 6, phase difference occurs in the light h, and thus the light becomes linearly polarized light rotated by 90 degrees and passes through the polarizing plate 45 on the output side, leading to white display.

Next, display control operation and touch detection operation of the display device 1D are described. A display driver (not shown) on the pixel substrate 2B line-sequentially supplies the common drive signal Vcom to the drive electrode patterns of the common electrode 43. Moreover, the display driver supplies an image signal to each pixel electrode 22 via a source line 25, and synchronously controls switching of TFT of each pixel electrode via a gate line 26 in a line-sequential manner. Thus, the liquid crystal layer 6 is applied with an electric field in a transverse direction (in a direction parallel to the substrate), the electric field being determined by the common drive signal Vcom and each image signal, for each of pixels, so that a liquid crystal state is modulated. In this way, display is performed by so-called inversion driving.

In contrast, on a side of the counter substrate 4B, the common drive signal Vcom is time-dimensionally sequentially applied to the drive electrode patterns of the common electrode 43. Thus, each of capacitance elements C1 (C11 to C1n) in an array is charged or discharged, the capacitance elements being formed in interconnections between the drive electrode patterns of the common electrode 43 applied with the signal Vcom and the detection electrode patterns of the sensor detection electrode 44, as in the first embodiment. Consequently, a detection signal Vdet having a size corresponding to a capacitance value of the capacitance elements C1 is outputted from each electrode pattern of the sensor detection electrode 44.

In this way, each of the methods described in the first to third embodiments may be applied to the display device 1D using liquid crystal of a transverse electric mode for a liquid crystal display element, in the same way as above. However, since this modification has a structure where the common electrode 43 as the touch sensor drive electrode is provided on a side of the pixel substrate 2B (on the TFT substrate 21), the common drive signal Vcom is extremely easily supplied from the TFT substrate 21 to the common electrode 43, and circuits, electrode patterns, and lines, those being necessary, may be concentrated on the pixel substrate 2, leading to integration of circuits. Therefore, a supply route (contact conduction pole 7) of the common drive signal Vcom from a pixel substrate 2 side to a counter substrate 4 side, the supply route having been necessary in the first embodiment, is unnecessary, leading to a more simplified structure.

While the sensor detection electrode 44 is provided on a surface side (on a side opposite to the liquid crystal layer 6) of the glass substrate 41 in the modification 3, the sensor detection electrode 44 may be provided on a side of the liquid crystal layer 6 with respect to the color filter 42.

Alternatively, the sensor detection electrode 44 may be provided between the glass substrate 41 and the color filter 42, or may be provided on an outer side of the polarizing plate 45.

APPLICATION EXAMPLES

Next, application examples of the display device with a touch sensor described in each of the embodiments and the modifications are described with reference to FIG. 28 to FIG. 32G. The display device according to each of the embodiments and the like may be applied to electronic devices in any field, including a television apparatus, a digital camera, a notebook personal computer, a mobile terminal such as mobile phone, and a video camera. In other words, the display device according to each of the embodiments and the like may be applied to an electronic device in any field, which displays an externally inputted video signal or internally generated video signal as an image or a video picture.

Application Example 1

Figure 28:
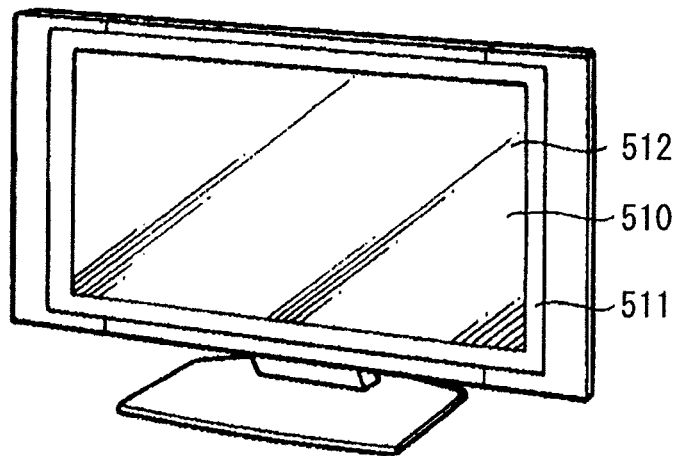
FIG. 28 is a perspective diagram showing appearance of application example 1 of the display device according to each of the embodiments.

FIG. 28 shows appearance of a television apparatus using the display device according to each of the embodiments and the like. The television apparatus has, for example, a front panel 511 and a video display screen 510 including filter glass 512, and the video display screen 510 corresponds to the display device according to each of the embodiments and the like.

Application Example 2

Figure 29A:
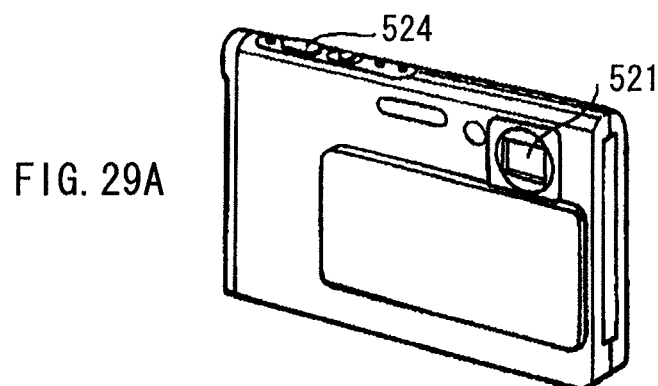
FIGS. 29A and 29B are perspective diagrams, where
Figure 29B:
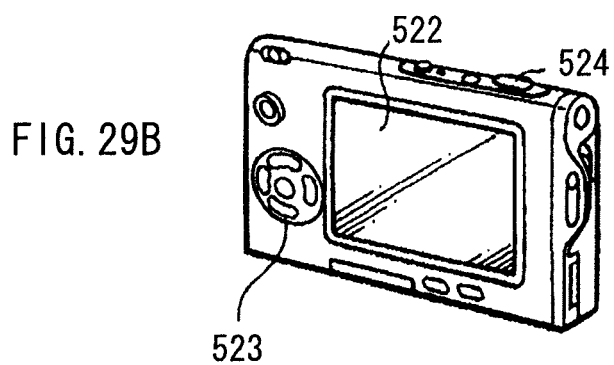

FIGS. 29A and 29B show appearance of a digital camera using the display device according to each of the embodiments and the like. The digital camera has, for example, a light emitting section for flash 521, a display 522, a menu switch 523 and a shutter button 524, and the display 522 corresponds to the display device according to each of the embodiments and the like.

Application Example 3

Figure 30:
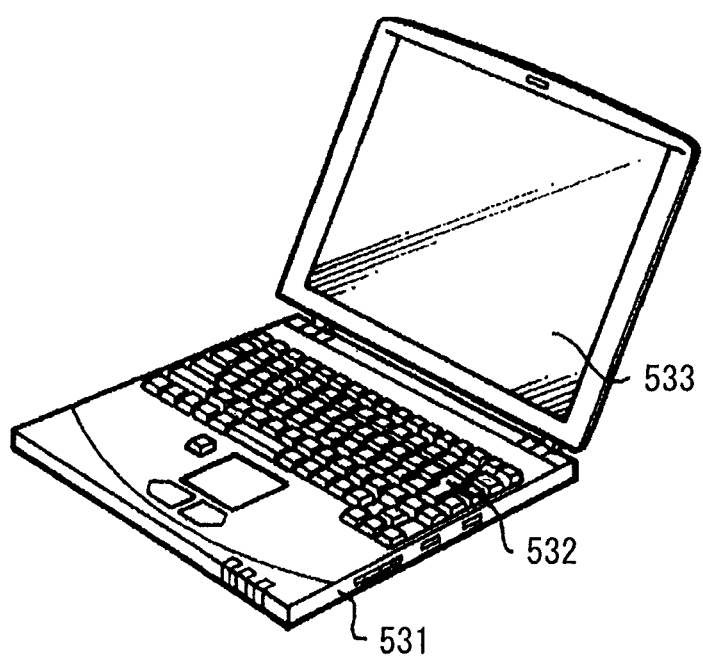
FIG. 30 is a perspective diagram showing appearance of application example 3.

FIG. 30 shows appearance of a notebook personal computer using the display device according to each of the embodiments and the like. The notebook personal computer has, for example, a body 531, a keyboard 523 for input operation of letters and the like, and a display 533 for displaying an image, and the display 533 corresponds to the display device according to each of the embodiments and the like.

Application Example 4

Figure 31:
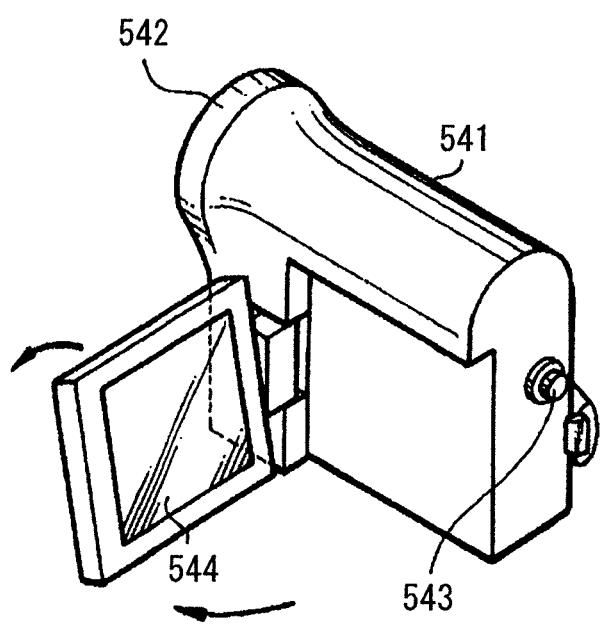
FIG. 31 is a perspective diagram showing appearance of application example 4.

FIG. 31 shows appearance of a video camera using the display device according to each of the embodiments and the like. The video camera has, for example, a body 541, a lens 542 for shooting an object provided on a front side-face of the body 541, and a start/stop switch 543 used in shooting, and a display 544. The display 544 corresponds to the display device according to each of the embodiments and the like.

Application Example 5

FIGS. 32A to 32G show appearance of a mobile phone using the display device according to each of the embodiments and the like. For example, the mobile phone is formed by connecting an upper housing 710 to a lower housing 720 by a hinge 730, and has a display 740, sub display 750, a picture light 760, and a camera 770. The display 740 or the sub display 750 corresponds to the display device according to each of the embodiments and the like.

While the invention has been described with the embodiments, the modifications and the application examples, the invention is not limited to the embodiments and the like, and may be variously modified or altered. For example, while the invention has been described with a configuration, as an example, where both of the long-distance detection mode (first detection mode) and the position detection mode (second detection mode) are exhibited, the position detection mode is not indispensable, and the invention may be configured such that only the long-distance detection mode is exhibited depending on use conditions or applications.

Moreover, while a case, where four detection modes in total from the long-distance detection mode (first detection mode) to the position-detection mode (second detection mode) are gradually exhibited, is given as an example in the embodiments and the like, the number of detection modes or distance resolution is not particularly limited. For example, the number of detection modes to be exhibited may be two, three, or five or more. As the number of detection modes increases, the distance resolution becomes higher, and a distance from the touch sensor, at which an object is present, is more easily determined.

Furthermore, while the embodiments and the like have been described with a case, as an example, where gradual detection is performed with the long-distance detection mode as an initial mode, the initial mode may not be necessarily the long-distance detection mode, and another detection mode such as the position detection mode may be used as the initial mode.

Moreover, while the display device using a liquid crystal display element as a display element has been described in the embodiments and the like, the invention may be applied to a display device using another display element, for example, an organic EL element.

Furthermore, a series of processing described in the embodiments and the like may be performed by hardware or software. In the case that the series of processing is performed by software, a program configuring the software is installed in a general-purpose computer or the like. Such a program may be beforehand recorded in a recording medium built in a computer.

The present application contains subject matter related to that disclosed in Japanese Priority Patent Application JP2009-155827 filed in the Japan Patent Office on Jun. 30, 2009 and Japanese Priority Patent Application JP 2010-050483 filed in the Japan Patent Office on Mar. 8, 2010, the entire content of which is hereby incorporated by references.

It should be understood by those skilled in the art that various modifications, combinations, sub-combinations and alterations may occur depending on design requirements and other factors insofar as they are within the scope of the appended claims or the equivalent thereof.

What is claimed is:
1. A touch sensor comprising:
  one or more electrodes having capacitance, the electrodes including a plurality of common electrodes;
  a detection circuit applying drive signals to at least one of the electrodes to detect an object based on detection signals obtained from the electrodes in response to the drive signals; and a controller operating to change a range of electric flux lines generated by the electrodes, wherein the controller causes a change in a maximum range of the electric lines of force in accordance with a detection result by the detection circuit and the electrodes have a plurality of electrode patterns extending along a first direction and a second direction perpendicular to the first direction such that the electrodes intersect; and a controller configured to cause a pixel voltage of pixel electrodes to be higher than an off voltage of a gate of a corresponding pixel TFT, after applying the drive signal to the common electrodes.

2. The touch sensor according to claim 1 further comprising a first timing controller driving a plurality of electrode patterns in such a manner that one or more electrode patterns are selected to be driven at a time, while such a selection of the electrode patterns is shifted in sequence, thereby allowing all the plurality of electrode patterns to be scanned for driving, wherein the controller changes number of the electrode patterns to be selected in accordance with the detection result.

3. The touch sensor according to claim 1 having a first detection mode in which the number of the electrode patterns to be selected is relatively large and a second detection mode in which the number of the electrode patterns to be selected is relatively small, wherein the detection circuit detects presence of the object in a first detection mode, and detects a position of the object in a second detection mode.

4. The touch sensor according to claim 3 further having another detection mode or two or more other detection modes, a number of the electrode patterns selected in each of the another detection mode or the other detection modes lying between the number of the electrode patterns selected in the first detection mode and the number of the electrode patterns selected in the second detection mode, wherein the detection circuit detects presence of the object in each detection mode, and then outputs, for each detection mode, a detection result to the controller, and the controller increases or decreases the number of the electrode patterns to be selected based on the detection result inputted from the detection circuit.

5. The touch sensor according to claim 4, wherein the controller decreases the number of the electrode patterns to be selected when presence of an object is detected by the detection circuit, and the controller increases the number of the electrode patterns to be selected when presence of an object is not detected by the detection circuit.

6. The touch sensor according to claim 1 further comprising a second timing controller selectively allowing one or more of the plurality of electrode patterns to be valid, wherein the controller changes number of the electrode patterns to be selected in accordance with the detection result.

7. The touch sensor according to claim 6 having a first detection mode in which the number of the electrode patterns to be selected is relatively small and a second detection mode in which the number of the electrode patterns to be selected is relatively large, wherein the detection circuit detects presence of the object in a first detection mode, and detects a position of the object in a second detection mode.

8. The touch sensor according to claim 7 further having another detection mode or two or more other detection modes, a number of the electrode patterns selected in each of the another detection mode or the other detection modes lying between the number of the electrode patterns selected in the first detection mode and the number of the electrode patterns selected in the second detection mode, wherein the detection circuit detects presence of the object in each detection mode, and then outputs, for each detection mode, a detection result to the controller, and the controller increases or decreases the number of the electrode patterns to be selected based on the detection result inputted from the detection circuit.

9. The touch sensor according to claim 1 further comprising a third timing controller driving the plurality of electrode patterns through applying the drive signal to each of the electrode patterns in sequence, wherein the controller changes amplitude of the drive signal in accordance with the detection result.

10. The touch sensor according to claim 9 having a first detection mode in which the amplitude of the drive signal is relatively large and a second detection mode in which the amplitude of the drive signal is relatively small, wherein the detection circuit detects presence of the object in a first detection mode, and detects a position of the object in a second detection mode.

11. The touch sensor according to claim 10 further having another detection mode or two or more other detection modes, an amplitude of the drive signal used in each of the another detection mode or the other detection modes lying between the amplitude of the drive signal used in the first detection mode and the amplitude of the drive signal used in the second detection mode, wherein the detection circuit detects presence of the object in each detection mode, and then outputs, for each detection mode, a detection result to the controller, and the controller performs control of increasing or decreasing the amplitude of the drive signal based on the detection result inputted from the detection circuit.

12. The touch sensor according to claim 1 further comprising a display unit including the touch sensor.

13. The touch sensor of claim 12, wherein the controller selects from plural distance detection modes, each having a different range of reach for the electric lines of force generated between the electrodes.

14. A display unit comprising:

a plurality of display pixel electrodes;

one or more common electrodes provided to face the display pixel electrodes, wherein the common electrodes also separately provide sensor-purpose drive signals;

a display layer;

a display control circuit controlling image display performance of the display layer through applying an image-signal-based-voltage between the display pixel electrodes and the common electrodes;

one or more electrodes having capacitance;

a detection circuit which generates detection signals based on the sensor-purpose drive signals; and a controller operating to change a range of electric flux lines generated by the electrodes, wherein the controller causes a change in a maximum range of the electric lines of force in accordance with a detection result by the detection circuit and the electrodes have a plurality of electrode patterns extending along a first direction and a second direction perpendicular to the first direction such that the electrodes intersect;

a timing controller applying a display-purpose common drive signal and the sensor-purpose drive signal to the common electrodes at respective timings which are different from each other; and TFT elements in correspondence to the plurality of display pixel electrodes, respectively, wherein gate potential in an off state of each of the TFT elements satisfies following expression (1), $$VgateL \leq VsigL - \Delta Vcom + Vth \qquad (1)$$

where VgateL is off gate potential of each TFT element, VsigL is low potential of a video signal, $\Delta$Vcom is a difference between a minimum value and a maximum value of a sensor-purpose drive signal, and Vth is a threshold voltage of each TFT element.

15. The display unit according to claim 14, wherein the timing controller applies the sensor-purpose drive signal after a lapse of a certain period of time, from application of the display-purpose common-drive signal.

16. The display unit according to claim 14, wherein the timing controller applies the sensor-purpose drive signal only in a period corresponding to detection timing.

* * * * *